US012475981B2

(12) United States Patent
Barker et al.

(10) Patent No.: US 12,475,981 B2
(45) Date of Patent: Nov. 18, 2025

(54) MULTIDEVICE NOTIFICATION SYNCHRONIZATION

(71) Applicant: Apple Inc., Cupertino, CA (US)

(72) Inventors: Matthew Barker, Palo Alto, CA (US); Nathan G. Racklyeft, Carlsbad, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/677,143

(22) Filed: May 29, 2024

(65) Prior Publication Data

US 2024/0404661 A1 Dec. 5, 2024

Related U.S. Application Data

(60) Provisional application No. 63/470,767, filed on Jun. 2, 2023.

(51) Int. Cl.
*G16H 10/60* (2018.01)
*G16H 40/20* (2018.01)

(52) U.S. Cl.
CPC ............. *G16H 10/60* (2018.01); *G16H 40/20* (2018.01)

(58) Field of Classification Search
None
See application file for complete search history.

(56) References Cited

U.S. PATENT DOCUMENTS

2009/0327354 A1* 12/2009 Resnick .............. H04L 67/1095
2013/0268292 A1* 10/2013 Kim ....................... G16H 40/67 705/2
2015/0363603 A1* 12/2015 Hsu ......................... H04L 63/18 707/783
2019/0138992 A1* 5/2019 Chaudhri ............... G06Q 10/10
2021/0151147 A1 5/2021 Dempers et al.
2022/0392590 A1* 12/2022 Winstrom .............. G16H 80/00
2023/0115319 A1* 4/2023 Aher ..................... H04L 51/043 709/238
2023/0328147 A1* 10/2023 Xin ....................... H04L 51/224 709/224
2024/0040343 A1* 2/2024 Lin ...................... G04G 9/0064

OTHER PUBLICATIONS

International Patent Application No. PCT/US2024/032001 , International Search Report and Written Opinion, Mailed on Sep. 26, 2024, 11 pages.

* cited by examiner

*Primary Examiner* — David J Stoltenberg
(74) *Attorney, Agent, or Firm* — Kilpatrick Townsend & Stockton LLP

(57) ABSTRACT

A second computing device can receive a hold instruction from a first computing device. The hold instruction can instruct the second computing device to hold a second notification until the second computing device receives first health information. The first computing device can be configured to transmit the hold instruction based on rescheduling a first notification on the first computing device to be displayed at a first time based at least in part on the first health information. The second notification can have been previously scheduled to be displayed at a second time. The second notification can correspond to the first notification. The second computing device can hold the second notification. The second computing device can receive the first health information. The second computing device can reschedule the second notification to be displayed at a third time based at least in part on the first health information.

20 Claims, 12 Drawing Sheets

MULTIDEVICE NOTIFICATION SYNCHRONIZATION

CROSS-REFERENCES TO RELATED APPLICATIONS

This application claims priority under 35 U.S.C. § 119 (e) to U.S. Provisional Application Ser. No. 63/470,767, filed Jun. 2, 2023, entitled "MULTIDEVICE NOTIFICATION SYNCHRONIZATION," which is incorporated herein by reference in its entirety.

BACKGROUND

Electronic devices, especially portable electronic user devices, are quickly becoming ubiquitous in every modern society. Such devices can be used to collect and store personal information, such as health data, about a user.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method includes receiving, by a second device, a hold instruction from a first device. The hold instruction can instruct the second device to hold a second notification until the second device receives first health information. The first device can be configured to transmit the hold instruction based on rescheduling a first notification on the first device to be displayed at a first time based at least in part on the first health information. The second notification can have been previously scheduled to be displayed at a second time. The second notification can correspond to the first notification. The computer-implemented method also includes holding, by the second device, the second notification. The computer-implemented method also includes receiving, by the second device, the first health information. The computer-implemented method also includes rescheduling, by the second device, the second notification to be displayed at a third time based at least in part on the first health information. Other embodiments of this aspect include corresponding computer systems, apparatus, and computer programs recorded on one or more computer storage devices, each configured to perform the actions of the methods.

Another general aspect includes another computer-implemented method. The computer-implemented method includes receiving, by a first device, first health information. The computer-implemented method also includes rescheduling, by the first device, a first notification on the first device to be displayed at a first time based at least in part on the first health information. The first notification can have been scheduled to be displayed at a second time. The computer-implemented method also includes transmitting, by the first device, a hold instruction to a second device. The hold instruction can instruct the second device to hold a second notification until the second device receives the first health information. The second notification can correspond to the first notification. Other embodiments of this aspect include corresponding computer systems, apparatus, and computer programs recorded on one or more computer storage devices, each configured to perform the actions of the methods.

Another general aspect includes another computer-implemented method. The computer-implemented method includes receiving, by a service provider, first health information from a first device. The first device can be configured to reschedule a first notification on the first device to be displayed at a first time based at least in part on the first health information. The first notification can have been scheduled to be displayed at a second time. The computer-implemented method also includes receiving, by the service provider, a request for the first health information from a second device. The second device can be configured to receive a hold instruction from the first device. The hold instruction can instruct the second device to hold a second notification until the second device receives the first health information. The second notification can correspond to the first notification. The computer-implemented method also includes transmitting, by the service provider, the first health information to the second device. The second device can be configured to reschedule the second notification to be displayed at a third time based at least in part on the first health information. Other embodiments of this aspect include corresponding computer systems, apparatus, and computer programs recorded on one or more computer storage devices, each configured to perform the actions of the methods.

DETAILED DESCRIPTION

Figure 1:
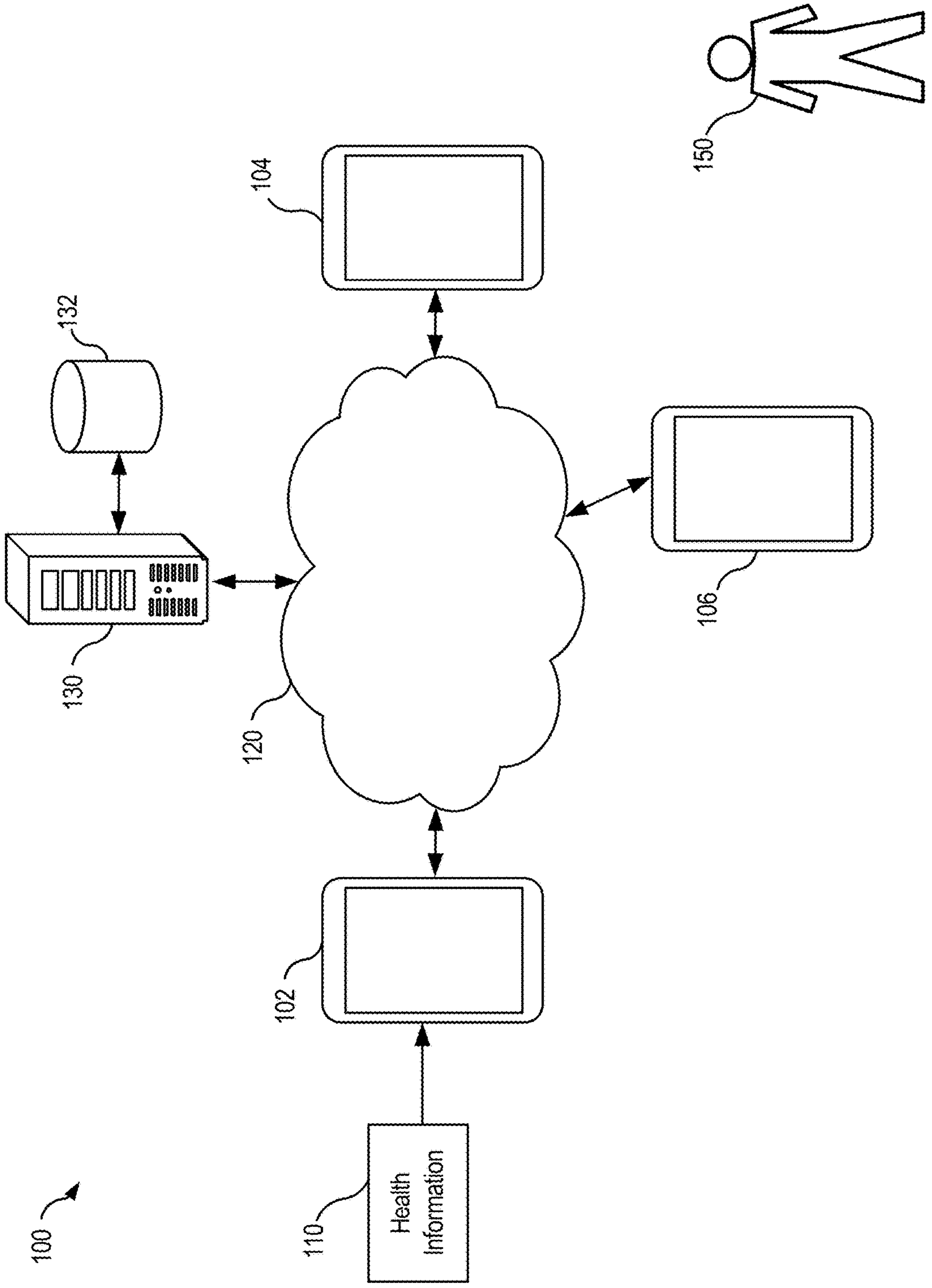
FIG. 1 illustrates a block diagram for a system synchronizing notifications across multiple devices, according to at least one example.

Certain embodiments of the present disclosure relate to devices, computer-readable medium, and methods for implementing various techniques for various features of multidevice notification synchronization. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, methods, systems, devices, and computer-readable media that provide mechanisms for synchronizing notifications across multiple devices. The techniques described herein enable synchronized notifications and prevent conflicting notifications across multiple devices associated with a single profile (e.g., a single user account used on each of the multiple devices). Example devices can include phones, smartwatches, laptops, computers, computing devices, or any user device. In some conventional notification systems involving multiple devices, a notification can be generated on a single device and the notification can be sent to the other devices for display. In such a notification system, the device generating the notification could be considered a source of truth for the notifications across the multiple devices. To enable a device to be a source of truth for all information related to the generation of notifications across multiple devices, the multidevice notification system could require robust, fast, bandwidth-intensive, and power-intensive information synchronization systems to makes sure the device generating the notification had all information necessary to generate notifications that are true across the multiple devices. Such a system would require constant transmission of information from other devices to the source of truth device which would be bandwidth and power intensive.

The techniques described herein enable each device, in a multidevice system, to generate its own notification based on information existing on the device and thus eliminating the need to maintain a source of truth at a single device. By eliminating a source of truth at a single device, the bandwidth and power intensive aspects of a multidevice notification system are reduced. In a multidevice notification system where each device generates its own notification based on information existing on the device, the multidevice notification system can be designed to limit conflicting notifications using the techniques described herein. Notifications can be conflicting if the notifications are based on different information. For example, a notification on a first device can indicate that a user should take their medication. A conflict could occur, however, if the user had already taken the medication and input information about this fact at a second device. Because the first device may not have been informed about the information input at the second device, it would present the notification, which could cause user confusion.

For example, a first device and a second device each may maintain a health information datastore for a user (e.g., medications taken, tracking menstrual cycle, steps taken that day, food eaten, calories burned, symptoms, etc.). Both the first device and the second device can have the same applications with the same analysis logic used to generate notifications based on evaluating the health information datastore (e.g., notifications indicating that the user should take their medication, or that a fertility window is beginning). The health information datastore may be replicated or otherwise shared between the two devices (e.g., by synchronizing via a cloud service). Because of this, each device may generate equivalent notifications when evaluating their respective health information datastores. At a future time, the first device can receive new health information regarding the user (e.g., the user inputting new information regarding taking medication, or information obtained via the sensors of the first device) and determine that a first notification on the first device needs to be rescheduled to be displayed at a new time. However, the new health information is not immediately synced to the second device or to a cloud service due to network, bandwidth, and/or power constraints of the notification system and/or the first device, and/or privacy aspects. Because the second device generates its own notifications, the second device could display a conflicting notification having not received the new health information. As shown in this example, each device can have different health information and generate different notifications based on the different health information, leading to conflicting notifications. The mechanisms described herein enable a device to prevent conflicting notifications from being displayed on a second device until the new information is received on the second device. Alternatively, and additionally, the mechanisms described herein enable the first device to cause the second device to display a notification or delete a notification when certain criteria are satisfied.

In some examples, the first device can receive first health information. The first device can determine that a first notification needs to be rescheduled based on the first health information. The first device can then send a hold instruction to a second device to not display a particular notification until the second device receives the first health information. The first device can then send the first health information to a service provider. The second device may not display the particular notification until the second device receives the first health information from the service provider. In some examples, the second device can request the first health information from the service provider after the second device is unlocked from a closed access state. Once the second device receives the first health information, the second device can determine to reschedule the particular notification.

Turning now to a first particular example, a notification scheduled to be presented on a second user device (e.g., a tablet) associated with a user profile can be delayed or otherwise held based on health information received by a first user device (e.g., a smart phone). For example, the user can log first health information using a health application on the user's phone. The first health information may relate to an aspect of the user's health (e.g., tracking a menstrual cycle). Once the first health information has been logged, the health application on the phone can determine that a first notification based on the first health information should be rescheduled (e.g., the notification is scheduled to display sooner or display later). The application can then determine that the first notification was rescheduled. The phone can then send a hold instruction to the user's tablet, which tells the tablet to not display a corresponding second notification on the tablet regarding the user's next period until the tablet receives the first health information. The phone can send the hold instruction to the tablet via a variety of communications channels, such as WiFi, Bluetooth, a LAN, a WAN, and the like. The phone can send, subsequently or in parallel, the first health information to a service provider. At a later time, the tablet can request the first health information from the service provider. For example, the tablet can be configured to request health information when the tablet is unlocked from a closed access state. The tablet can receive the first health information and determine that the corresponding second notification regarding the user's next period should be rescheduled to start sooner.

Turning now to a second particular example, a notification scheduled to be presented on a second user device (e.g., a laptop) associated with a user profile can be dismissed based on health information received by a first user device (e.g., a smart phone). A notification scheduled to be displayed can be dismissed by a) preventing the notification from being displayed on a user device and/or b) removing an already-delivered notification from being displayed on a user device. For example, the user can log first health information using a health application on the user's phone. The first health information may relate to an aspect of the user's health (e.g., logging medications taken at a specific time). In some examples, the first health information can be entered in response to the user receiving or seeing a notification (e.g., a user can receive a notification to take their morning medications on the user's phone). Once the first health information has been logged, the health application can determine that a first notification based on the first health information should be dismissed (e.g., a notification to take medication in the morning). In some examples, the first notification can be on the first user device and be dismissed. In some examples, a corresponding second notification would typically be displayed on a second user device (e.g., the user's laptop) because a version of the health application on the second user device would trigger the same notification. The phone can send a dismiss instruction to the user's laptop, which tells the laptop to dismiss the corresponding second notification on the laptop. The phone can send a dismiss instruction to the laptop via a variety of communications channels, such as WiFi, Bluetooth, a LAN, a WAN, and the like. In the example of dismissing a notification to take medication, the user can log that they have taken their morning medications on the user's phone constituting the first health information. The health application on the phone can determine that a dismiss instruction should be sent to the other devices, including the user's laptop, associated with the health information account regarding the user. The phone can send the dismiss instruction to the other devices, for example the laptop. Once the laptop receives the dismiss instruction, the laptop can delete a corresponding notification on the laptop telling the user to take their morning medication.

Turning now to a third particular example, a first user device (e.g., a smart phone) can send a send instruction causing a second user device (e.g., a tablet) to send a notification. When a device sends a notification, the device displays the notification. Displaying a notification can also be referred to as presenting a notification. For example, the phone can receive first health information. The first health information may relate to an aspect of the user's health (e.g., setting up the phone to have access to the health information account of the user). The phone can determine that the tablet should display a notification (e.g., a notification that a new device has been added to the health information account of the user). The phone can send a send instruction to the user's tablet, which tells the tablet to send the notification. The phone can send the send instruction to the tablet via a variety of communications channels, such as WiFi, Bluetooth, a LAN, a WAN, and the like.

The examples described herein address a number of technical problems and provide for a number of technical improvements. In some examples, these improvements additionally improve the functioning of various components of a system in which the techniques are implemented. The techniques described herein provide for the synchronization of notifications in a manner that minimizes network traffic and minimizes power consumption, as compared to conventional systems. For example, rather than sending notifications to display between devices, each device generates their own notifications based on the health information on each respective device. In a system where notifications are constantly sent between devices, devices would constantly be sending messages over the networks and consuming power to constantly send and receive notifications. By minimizing the sending of notifications and other messages between devices, devices can reduce network traffic, bandwidth usage, and increase battery life.

Additionally, having each device generate its own notifications is particularly important when the information and notifications relate to health information due to increased privacy and security concerns for health information. Rather than sending actual notifications with obtained health information or derived determinations between devices, the health information is only sent to and received from the service provider during specific windows. For example, the health information may only be sent to and received from the service provider while the device is unlocked from a closed access state. For example, the device could be unlocked from a closed access state with minimal functionality by inputting a password or using biometrics. The unlocking of the device can be a proxy for the determination that the user has control of the device.

Turning now to the figures, FIG. 1 illustrates a block diagram 100 of multidevice notification synchronization techniques described herein. A user device 102 can store health information associated with a user profile of a user 150. Health information can include steps taken, calories burned, caloric/food intake, menstrual cycle tracking, medication tracking, health-related recommendations/suggestions, insights regarding the user's health, indications of trends in health data, or any other kind of health information. The health information on the user device 102 can be synced to an account (for example, a health information account) associated with the user 150 through a service provider 130. User devices 102, 104, 106 can communicate with the service provider 130 through a network 120. The network 120 can be any kind of network. For example, the network 120 can be a local area network (LAN) or a wide area network (WAN). The network 120 can be a WiFi network or an equivalent network. The network can be any communication channel, such as a Bluetooth network or other short-range network connecting only two devices. The network can be a proprietary communication channel between two devices, for example, a communication channel between a phone and a smartwatch. Additionally, the user devices 102, 104, 106 and the service provider 130 can communicate via particular frameworks over the communication channels. For example, the user device 102 can communicate with user device 104 via a peer-to-peer messaging framework. The peer-to-peer messaging framework allows for quick transmission of instructions on the same order as transmission of text messages through a texting application or the like.

The account can be accessed through communication with the service provider 130. The health information associated with the account can be stored in a health information database 132. The service provider 130 can communicate with the health information database 132 in sync health information between the user devices 102, 104, 106 and the health information database 132. In some examples, the account may be associated with the user profile, which may be provided by the service provider 130. When the user device 102 receives new health information 110, the user device may sync the new health information 110 with the service provider 130. As illustrated, the user can also have other user devices 104, 106 that share the same user profile and account. As such, each of these other user devices 104, 106 may also have access to the health information 110 of the user. Each user device can have its own health information datastore associated with the user. User devices 102, 104, 106 are illustrated as handheld portable user devices such as smartphones. As described herein, an example user device can be any suitable user device such as a smartphone, tablet, media player, laptop, wearable device, smartwatch, and the like. In some examples, the user device may include one or more applications, which may include custom-built algorithms and other logic, to enable performance of at least some of the techniques described herein. The user device can also include storage media for storing computer-executable instructions (e.g., that make up the application) and other data such as described herein. In some examples, the user devices 102, 104, 106 can be associated with a single user 150. In some examples, the user devices 102, 104, 106 can be associated with different users, but can all have access to the health information database 132 containing health information associated with the user 150.

FIGS. 2-5, 7-10 illustrate example flow diagrams showing processes 200, 300, 400, 500, 700, 800, 900, and 1000, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

Figure 2:
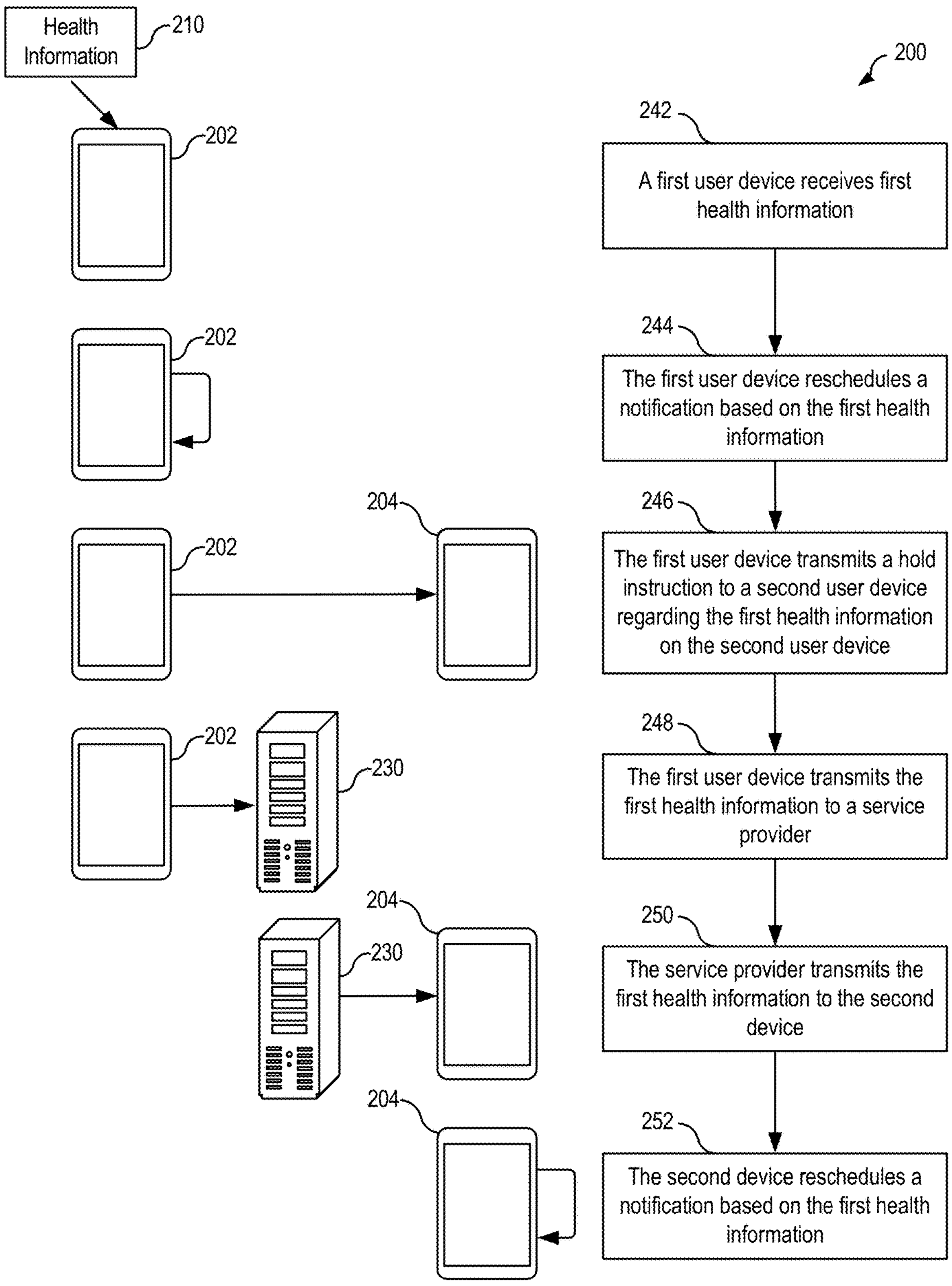
FIG. 2 illustrates a block diagram and a flowchart of a process for synchronizing notifications across multiple devices, according to at least one example.

FIG. 2 illustrates a block diagram and a flow chart of a process 200 for multidevice notification synchronization, according to at least one example. For example, multidevice notification synchronization may include a first user device sending a hold instruction to a second user device to hold displaying a notification until the second user device has received first health information (e.g., the health information that initially triggers a notification at the first user device). The diagram includes the first user device 202 (for example, user device 102 of FIG. 1), a second user device 204 (for example, user device 104 of FIG. 1), and a service provider 230 (for example, service provider 130 of FIG. 1). As described herein, the service provider can transmit and receive health information from a health information database (for example, the health information database 132 of FIG. 1). The first user device 202 and the second user device 204 are associated with an account (or profile) of the user. In some examples, the account can be associated with health information and/or other information.

The process 200 begins at block 242 by the first user device 202 receiving health information 210. As described herein, the health information 210 can be health information input by a user of the first user device 202 or it can be health information received by the first user device 202 via sensors. Example health information input by a user includes logs for medication taken, menstrual cycles, weight, caloric and nutritional intake, and other types of health information that the user self-reports. Example health information received via sensors includes heart rate, blood oxygen, step tracking, and other types of health information that the user device can obtain via sensors on the user device. The first user device 202 can assign the health information 210 an identifier for use when sending a hold instruction to other devices as described herein.

In some examples, the first health information can be collected from a web server. In some examples, the first health information can be obtained from a server accessible through a network such as database from a medical provider. In some examples, the first health information can be obtained from a gateway for a health database system. In some examples, the first health information can be received from another user device which received health information. For example, the other user device can be a secondary device or an accessory device such as a watch. In some examples, the another user device can receive health information via user input or via sensors of the another user device.

At block 244, the first user device 202 reschedules a first notification based on the first health information 210. For example, the first user device 202 can run the algorithm for scheduling the first notification wherein the algorithm can use the first health information 210. When the first user device 202 receives the first health information 210, software on the first user device 202 (for example, a health application) can determine that new health information has been received on the first user device 202. The first user device 202 can determine if the first health information 210 is relevant to any notifications scheduled to display on the first user device. For example, the first user device 202 can determine the first health information 210 is relevant to a first notification scheduled to display on the first user device 202 at a first time. The first user device 202 can determine that the first notification should be rescheduled to be displayed on the first user device 202 at a second time based on the first health information. For example, the first user device 202 can run the algorithm for scheduling the first notification wherein the algorithm can use the first health information 210. The first user device 202 can determine a notification category regarding the first notification.

At block 246, the first user device 202 transmits a hold instruction to a second user device 204 regarding the first health information 210 on the second user device 204. The hold instruction can include an identifier for the first health information 210 and a notification category based on the notification category of the first notification. The hold instruction can cause the second user device 204 to hold notifications of the notification category. In some examples, holding the notifications of the notification category includes preventing the notifications of the notification category from being displayed on the second user device 204 until the first health information 210 has been received by the second user device 204. In some examples, holding notifications of the notification category includes dismissing notifications of the notification category being displayed on the second user device 204 until the first health information 210 has been received by the second user device 204. In some examples, the hold instruction can indicate a notification category (also referred to as notification type) to hold. For example, the hold instruction can indicate that the second user device 204 should hold notifications for menstrual cycle tracking or hold notifications for medication tracking. In some examples, the hold instruction can indicate a notification subcategory to hold. For example, the hold instruction can indicate that the second user device should hold notifications for a subcategory of notifications for menstrual cycle tracking or hold a subcategory of notifications for medication tracking.

In some examples, the hold instruction can be stored on the second user device 204 until the first health information 210 is received by the second user device 204. In some examples, the hold instruction includes an expiration date. The hold instruction can be only valid until the expiration date. After the expiration date, the second user device 204 can ignore or delete the hold instruction. In some examples, the hold instruction includes one or more criterion. The hold instruction can be only valid as long as any necessary criterion are met and any impermissible criterion are not met. Criteria can be determined by the application determining to send a hold instruction. For example, criteria can include custom data objects that can be interpreted by an application to determine if the criteria is met. In some examples, the criteria can also include an indication that the hold instruction is no longer valid as soon as health data is considered consistent on the second user device 204 with other user devices and/or the service provider 230. In some examples, the criteria can also be that the hold instruction is valid until the first health information 210 arrives.

In some examples, the hold instruction indicates a specific notification to hold. For example, the hold instruction can indicate that the second user device 204 should hold a second notification until the notification is rescheduled or determined to not need to be rescheduled. In some examples, holding the second notification can include preventing the second notification from being displayed on the second user device 204 until the second notification has been rescheduled to a new time. In some examples, holding the second notification includes dismissing the second notification from being displayed on the second user device 204 until the second notification has been rescheduled to a new time. In some examples, the hold instruction can be stored on the device until the second notification is either rescheduled to a new time or determined to not need to be rescheduled.

When the first user device 202 transmits the hold instruction to the second user device 204, the hold instruction can be sent over a peer-to-peer messaging framework. The peer-to-peer messaging framework allows for transmission of the hold instruction over a variety of types of connections (which can also be referred to as communication channels in some contexts). For example, the peer-to-peer messaging framework can enable the first user device 202 to transmit the hold instruction to the second user device 204 over a short-range communication medium such as Bluetooth or near field communications. Likewise, the peer-to-peer messaging framework can enable the first user device 202 to transmit the hold instruction to the second user device 204 over a medium-range communication medium such as WiFi or any type of local area network, the peer-to-peer messaging framework can enable the first user device 202 to transmit the hold instruction to the second user device 204 over a network-based communication medium such as a wide area network or through a service provider 230. Such a peer-to-peer messaging framework allows for quick transmission of instructions on the same order as transmission of text messages through a texting application or the like. Likewise, any instruction described herein (for example, the send instruction or dismiss instruction) can be transmitted over the peer-to-peer messaging framework.

Using the peer-to-peer messaging framework for sending instructions (for example, the hold instruction, send instruction, and dismiss instruction) has several benefits. Sending the instructions over a peer-to-peer messaging framework allows for the instructions to arrive prior to health information. The health information can be transmitted to user devices via an eventually-consistent system that is not focused on speed, but rather on reliability of sending/receiving information at some point. Furthermore, the eventually-consistent system can be designed to handle streaming, unbounded data that is in anchor order. In this way, the eventually-consistent system can be configured to transmit and make consistent health information that can be constantly streaming in chronological order. Additionally, instructions sent by the peer-to-peer messaging framework can be processed by user devices in a closed access state. In this way, instructions can be processed prior to a user device being unlocked from a closed access state. In some examples, health information sent over the eventually-consistent system cannot be processed, received, or sent to a closed access device. Furthermore, instructions sent by the peer-to-peer messaging framework can wake the device in order for the instructions to be processed. In some examples, health information sent over the eventually-consistent system is unable to wake a device to be processed. Additionally, instructions sent by the peer-to-peer messaging framework can be best-effort such that non-delivery of the instructions would not compromise the health information of a user. In some examples, health information sent over the eventually-consistent system has to be completely reliable in order to avoid compromising the health information of a user.

At block 248, the first user device 202 transmits the first health information 210 to a service provider 230. In some examples, the first user device 202 transmits the first health information 210 to a service provider 230 while the first user device 202 is unlocked from a closed access state. A user device can be in a closed access state with limited functionality. For example, the user device may have a lock screen which requires the password or using biometrics to unlock the user device to gain access to the majority of user device functionality and software. In some examples, the first user device 202 transmits the first health information 210 and any other health information received to the service provider 230 at regular intervals, regardless of when the first user device 202 received each sample of health information. For example, the first user device 202 may transmit all health information received every 10 seconds, every 30 seconds, every 1 minute, every 5 minutes, every 10 minutes, every 20 minutes, every 30 minutes, every 1 hour, every 2 hours, every 3 hours, and the like.

In some examples, the first user device 202 transmits the first health information 210. In some examples, the first user device 202 transmits a derivative of the first health information 210. For example, the first user device 202 transmits part of the first health information 210. In another example, the first user device 202 transmits changes to the store of health information on the first user device 202 which includes the first health information 210 or a part thereof. In another example, the first user device 202 transmits a state of the health information datastore on the first user device 202 which includes the first health information 210 or a part thereof.

The service provider 230 can determine which user devices have access to which health information. In some examples, the service provider 230 tracks the health information datastore for each user device associated with the account of the user. For example, the service provider 230 can maintain states for each device associated with the profile of the user. When the service provider 230 receives new health information from a user device the service provider 230 can update the state of the health information datastore for the device that sent the new health information and note for the state of each other user device that they do not have the new health information. For example, when the first user device 202 sends the first health information 210 to the service provider 230, the service provider 230 updates the state of the health information datastore for the first user device 202. The service provider 230 can also determine that the state of the health information datastore for other devices does not have the new health information 210. In some examples, the service provider 230 can transmit an indication to the other devices that do not have the new information 210 indicating that there is new health information 210 that can be transmitted to the other devices.

At block 250, the service provider 230 transmits the first health information 210 to the second user device 204. In some examples, the second user device 204 can transmit a request to the service provider 230 for the first health information 210 prior to the service provider 230 transmitting the first health information 210 to the second user device 204. In some examples, the service provider 230 transmits the first health information 210 to the second user device 204 after receiving a request for the first health information 210 from the second user device 204. In some examples, the second user device 204 can transmit a request to the service provider 230 requesting any new health information. As described herein, the service provider 230 may have already determined that the state of the health information datastore for the second user device 204 does not have the first health information 210 (or other health information). In some examples, the service provider 230 transmits the first health information 210 to the second user device 204 after receiving the request for new health information from the second user device 204. As described herein, the second user device 204 can be configured to only send a request to the service provider 230 when the second user device 204 is unlocked from a closed access state.

At block 252, the second user device 204 can reschedule the second notification based on the first health information 210. For example, the second user device 204 can run the algorithm for scheduling the second notification wherein the algorithm can use the first health information 210. In some examples, when the second user device 204 receives the first health information 210, software on the second user device 204 (for example, a health application) can determine that the first health information 210 has been received on a second user device 204 and that a hold instruction is associated with the first health information 210. In some examples, the second user device 204 can identify the second notification based on the hold instruction indicating that the second notification is associated with the first health information 210. In some examples, the second user device 204 can identify the second notification based on the hold instruction indicating that notifications of a particular a notification category should be held. Once the first health information 210 is received by the second user device 204, the second user device 204 can determine if any notifications of the indicated notification category should be rescheduled based on the first health information 210. In some examples, when the second user device 204 receives the first health information 210, software on the second user device 204 (for example, a health application) can determine that new health information has been received on the second user device 204. The second user device 204 can determine if the first health information 210 is relevant to any notifications scheduled to display on the second user device 204. For example, the second user device 204 can determine if the first health information 210 is used in any algorithms for currently scheduled notifications. In other examples, the second user device 204 can determine if and how the first health information 210 can affect currently scheduled notifications. The second user device 204 can determine if the first health information is relevant to a third notification scheduled to display on the second user device 204 at a fifth time. The second user device 204 can determine the third notification should be rescheduled to be displayed on the second user device 204 at a sixth time based on the first health information.

Figure 3:
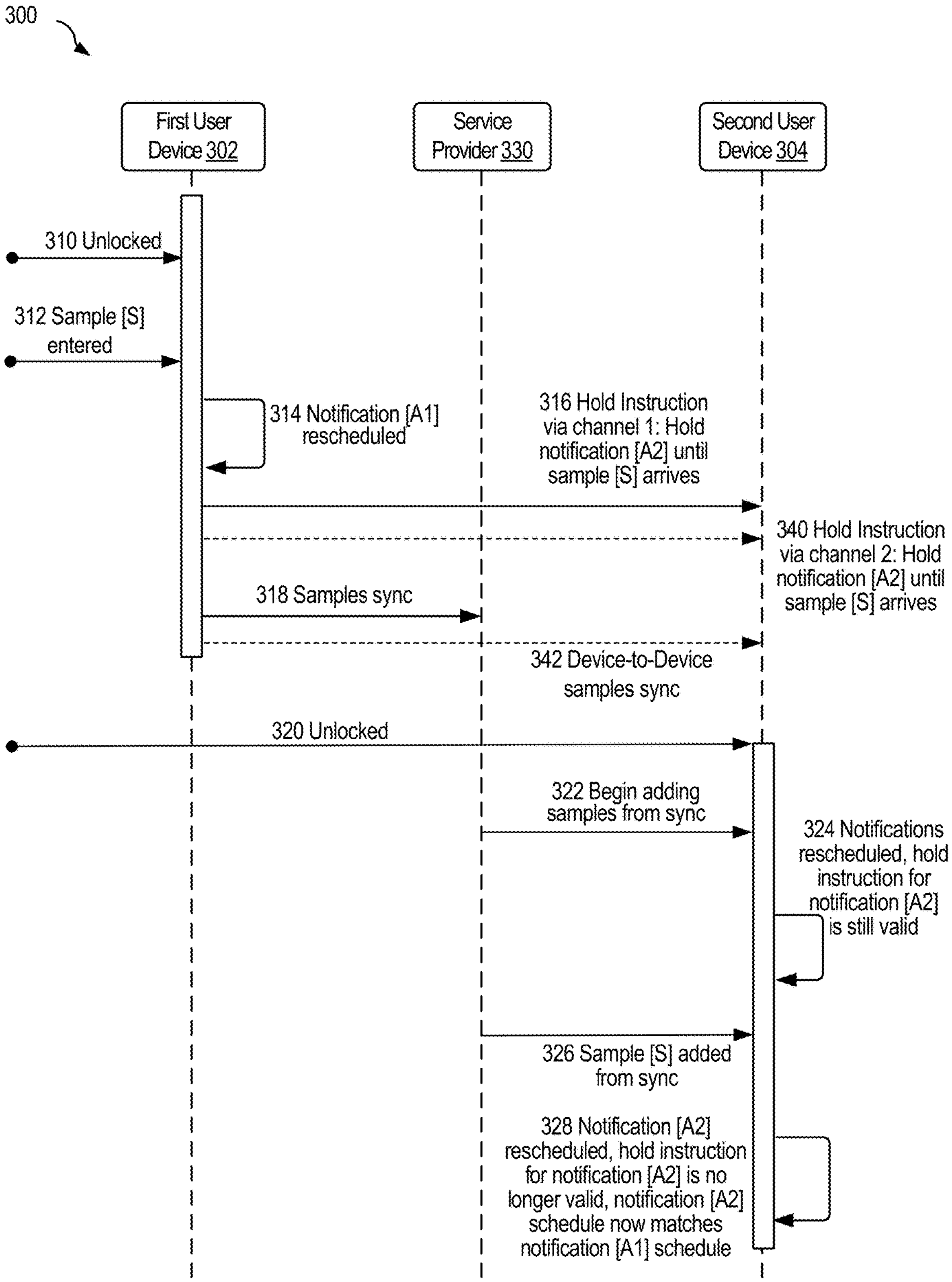
FIG. 3 illustrates a flowchart of a process for synchronizing notifications across multiple devices using a hold instruction, according to at least one example.

FIG. 3 illustrates a flow chart showing a process 300 for a first user device 302 (for example, the first user device 202 of FIG. 2) sending a hold instruction to a second user device 304 (for example, the second user device 204 of FIG. 2) to hold displaying a notification [A2] until the second user device 304 has received sample [S], a piece of health information (for example, the first health information 210 of FIG. 2), according to at least one example. Notification [A2] is associated with notification [A1], a notification scheduled to be displayed on the first user device 302. The process 300 can be performed by the first user device 302, the second user device 304, and the service provider 330 (for example, the service provider 230 of FIG. 2). The process 300 is a variation of the process 200, which includes various functions being performed by the various elements shown in FIGS. 1 and 2.

The process 300 may begin at 310, by the first user device 302 being unlocked from a closed access state. The first user device 302 can be in a closed access state with limited functionality. For example, the first user device 302 may have a lock screen which requires a password or using biometrics to unlock the first user device 302 to gain access to the majority of user device functionality, software, and data including health information.

At 312, the process 300 can include sample [S] being entered at the first user device 302. Sample [S] can be any health information (for example, the health information 210 of FIG. 2) that can be received by the first user device 302. In some examples, sample [S] can be received by a user inputting sample [S] into the first user device 302. In some examples, sample [S] can be obtained via sensors of the first user device 302. In some examples, the sample [S] can be collected from a web server. In some examples, sample [S] can be obtained from a server accessible through a network such as database from a medical provider. In some examples, the sample [S] can be obtained from a gateway for a health database system. In some examples, sample [S] can be received from another user device which received health information. For example, the other user device can be a secondary device or an accessory device such as a watch. In some examples, the another user device can receive health information via user input or via sensors of the another user device.

At 314, the process 300 can include the first user device 302 rescheduling notification [A1] (for example, the first notification as described in relation to FIG. 2). Prior to the rescheduling of notification [A1], notification [A1] was scheduled to be displayed on the first user device 302 at a first time. After receiving sample [S], the first user device 302 reschedules notification [A1] to be displayed at a second time. The first user device 302 reschedules notification [A 1] based at least in part on analyzing sample [S] using an algorithm to determine when to display notification [A1] on the first user device 302. For example, the first user device can run the algorithm for scheduling notification [A1] using sample [S] to determine that notification [A1] should be displayed on the first user device 302 at a second time. In some examples, the second time is not the same as the first time. In some examples, the second time is earlier than the first time. In some examples, the second time is later than the first time.

At 316, the process 300 can include the first user device 302 transmitting a hold instruction to the second user device 304 via a first channel (the first channel can also be referred to as channel 1). The hold instruction can instruct the second user device 304 to hold notification [A2] until the second user device 304 receives sample [S]. Notification [A2] on the second user device 304 can correspond to notification [A1] on the first user device 302. For example, notification [A2] on the second user device 304 can be the same notification category and/or the same notification subcategory as the notification [A1] on the first user device 302. In some examples, notification [A2] on the second user device 304 can have a same notification identifier as notification [A1] on the first user device 302. The first channel can be any communication connection or series of communication connections that connect the first user device 302 to the second user device 304. The first channel can be a wide area network (WAN). For example, a WAN can be the internet or a large private network. The first channel can be a localized channel. A localized channel can be a local area network (LAN). For example, a LAN can be a WiFi network. A localized channel can be a device-to-device communication channel. For example, a device-to-device communication channel can be a Bluetooth or near field communications (NFC) connection between two devices.

In some examples, holding the notification [A2] includes preventing the notification [A2] from being displayed on the second user device 304 until notification [A2] has been rescheduled on the second user device 304. In some examples, holding notification [A] includes preventing notification [A2] from being displayed on the second user device 304 until sample [S] is received. In some examples, holding notification [A2] includes dismissing notification [A2] from being displayed on the second user device 304 until notification [A2] has been rescheduled. In some examples, holding notification [A2] includes dismissing notification [A2] from being displayed on the second user device 304 until sample [S] is received.

At 318, the process 300 can include the first user device 302 syncing samples, including sample [S], to the service provider 330. In some examples, the first user device 302 transmits the samples, including sample [S] to a service provider 330 while the first user device 302 is unlocked from a closed access state. A user device can be in a closed access state with limited functionality. For example, the user device may have a lock screen which requires the password or using biometrics to unlock the user device to gain access to the majority of user device functionality and software. In some examples, the first user device 302 transmits the sampled received at the first user device 302 (including sample [S]) to the service provider 330 at regular intervals, regardless of when the first user device 302 received each sample of the samples. For example, the first user device 302 may transmit all samples received every 10 seconds, every 30 seconds, every 1 minute, every 5 minutes, every 10 minutes, every 20 minutes, every 30 minutes, every 1 hour, every 2 hours, every 3 hours, and the like.

At 320, the process 300 can include the second user device 304 being unlocked from a closed access state. The second user device 304 can be in a closed access state with limited functionality. For example, the second user device 304 may have a lock screen which requires a password or using biometrics to unlock the first user device 302 to gain access to the majority of user device functionality, software, and data including health information.

At 322, the process 300 can include the second user device 304 syncing samples from the service provider 330. In some examples, the second user device 304 can transmit a request to the service provider 330 for sample [S]. In some examples, the service provider 330 transmits sample [S] to the second user device 304 after receiving a request for sample [S] from the second user device 304. In some examples, the second user device 304 can transmit a request to the service provider 330 requesting any new samples since a last request for samples. In some examples, the second user device 304 can transmit a request to the service provider 330 requesting any new samples since samples were last synced to the second user device 304. As described herein, the service provider 330 may have already determined that the state of the health information datastore for the second user device 304 does not have the sample [S] (or other samples). In some examples, the service provider 330 transmits samples to the second user device 304 after receiving the request for samples from the second user device 304. As described herein, the second user device 304 can be configured to only send a request to the service provider 330 when the second user device 304 is unlocked from a closed access state.

At 324, the process 300 can include the second user device 304 beginning to reschedule notifications based on the samples added. As samples are synced to the second user device 304, notifications are rescheduled. The hold instruction received at (4) to hold notification [A2] is still valid until sample [S] is received. The second user device 304 does not reschedule notification [A2] until sample [S] is received and/or the algorithm for rescheduling/scheduling notification [A2] is run using sample [S]. At 326, the process 300 includes the second user device 304 receiving sample [S] from the service provider 330.

At 328, the process 300 can include the second user device 304 rescheduling the notification [A2] based on the sample [S]. The second user device 304 can determine that the hold instruction for notification [A2] from the first user device 302 related to sample [S] is no longer valid. For example, the second user device 304 can run the algorithm for scheduling notification [A2] wherein the algorithm can use sample [S]. In some examples, when the second user device 304 receives sample [S], software on the second user device 304 (for example, a health application as described in relation to FIG. 6) can determine that sample [S] has been received on a second user device 304 and that a hold instruction is associated with sample [S]. In some examples, the second user device 304 can identify notification [A2] based on the hold instruction indicating that notification [A2] is associated with the sample [S]. In some examples, the second user device 304 can identify the notification [A] based on the hold instruction indicating that notifications of the same notification category and/or notification subcategory as notification [A2] should be held. Once sample [S] is received by the second user device 304, the second user device 304 can determine if any notifications of the notification category associated with the hold instruction at (4) should be rescheduled based on sample [S]. In some examples, when the second user device 304 receives sample [S], software on the second user device 304 (for example, a health application as described in relation to FIG. 6) can determine that new health samples has been received on the second user device 304. The second user device 304 can determine if sample [S] is relevant to any notifications scheduled to display on the second user device 304. For example, the second user device 304 can determine if the same kind of health information as sample [S] is used in any algorithms for currently scheduled notifications. In other examples, the second user device 304 can determine if and how the sample [S] can affect currently scheduled notifications. In some examples, the schedule for notification [A2] matches the schedule for notification [A1] after the notification [A2] is rescheduled here. In some examples, the schedule for notification [A2} may not match the schedule for notification [A1]. For example, the algorithms on the first user device 302 and the second user device 304 may be different. The second user device 304 can determine if the sample [S] is relevant to a third notification, not notification [A2], scheduled to display on the second user device 304 at a fifth time. The second user device 304 can determine the third notification should be rescheduled to be displayed on the second user device 304 at a sixth time based on sample [S].

The second user device 304 can be configured to reschedule the notification [A2] to be displayed at a third time based at least in part on sample [S]. For example, the second user device 304 can run the algorithm for scheduling notification [A2] wherein the algorithm can use sample [S] to determine that notification [A2] should be displayed at the third time. In some examples, notification [A2] was previously scheduled to be displayed at a fourth time, wherein the fourth time and the third time are not the same. In some examples, the third time is earlier than the fourth time. In some examples, the third time is later than the fourth time.

The process 300 can also include optional actions that can be taken alternatively or additionally to the actions described above in relation to 310-328. At 340, the process 300 can include the optional action of first user device 302 transmitting a hold instruction to the second user device 304 via a second channel (the second channel can also be referred to as channel 2). In some examples, transmitting the hold instruction via the second channel can be simultaneously (or near simultaneously) transmitted as the hold instruction transmitted via the first channel as described in relation to 316 above. The hold instruction can be nearly identical or identical to the hold instruction sent via channel 1 as described in relation to 316. The hold instruction at 340 can instruct the second user device 304 to hold notification [A2] until the second user device 304 receives sample [S]. Notification [A2] on the second user device 304 can correspond to notification [A1] on the first user device 302. For example, notification [A2] on the second user device 304 can be the same notification category and/or the same notification subcategory as the notification [A1] on the first user device 302. In some examples, notification [A2] on the second user device 304 can have a same notification identifier as notification [A1] on the first user device 302. The second channel can be any communication connection or series of communication connections that connect the first user device 302 to the second user device 304. The second channel can be a wide area network (WAN). For example, a WAN can be the internet or a large private network. The second channel can be a localized channel. A localized channel can be a local area network (LAN). For example, a LAN can be a WiFi network. A localized channel can be a device-to-device communication channel. For example, a device-to-device communication channel can be a Bluetooth or near field communications (NFC) connection between two devices. The second channel can be a different channel than the first channel. For example, the first channel can be a WAN and the second channel can be a localized channel.

In some examples, the second user device 304 can receive the hold instruction via both channel 1 at 316 and channel 2 at 340. The second user device 304 can determine that the hold instruction received via channel 1 at 316 and the hold instruction channel 2 at 340 represent the same hold instruction and one of the hold instructions can be discarded or otherwise deleted.

At 342, the process 300 can include the first user device 302 syncing samples, including sample [S], to the second user device 304 via a device-to-device communication channel. For example, a device-to-device communication channel can be a Bluetooth or a near field communication channel.

In some examples, the first user device 202 transmits the samples, including sample [S], to the second user device 304 while the first user device 202 is unlocked from a closed access state. A user device can be in a closed access state with limited functionality. For example, the user device may have a lock screen which requires the password or use of biometrics to unlock the user device to gain access to the majority of user device functionality and software. In some examples, the first user device 302 transmits the samples, including sample [S], to the second user device 304 while both first user device 302 and the second user device 304 unlocked from a closed access state. In some examples, the first user device 302 transmits the sample received at the first user device 302 (including sample [S]) to the second user device 304 at regular intervals, regardless of when the first user device 302 received each sample of the samples. For example, the first user device 302 may transmit all samples received every 10 seconds, every 30 seconds, every 1 minute, every 5 minutes, every 10 minutes, every 20 minutes, every 30 minutes, every 1 hour, every 2 hours, every 3 hours, and the like.

In some examples, the second user device 304 can transmit a request to first user device 302 for sample [S]. In some examples, the first user device 302 transmits sample [S] to the second user device 304 after receiving a request for sample [S] from the second user device 304. In some examples, the second user device 304 can transmit a request to the first user device 302 requesting any new samples since a last request for samples. In some examples, the second user device 304 can transmit a request to the first user device 302 requesting any new samples since samples were last synced to the second user device 304. As described herein, the first user device 302 may have already determined that the state of the health information datastore for the second user device 304 does not have the sample [S] (or other samples). In some examples, the first user device 302 transmits samples to the second user device 304 after receiving the request for samples from the second user device 304. As described herein, the second user device 304 can be configured to only send a request to the first user device 302 when the second user device 304 is unlocked from a closed access state. In some examples, the second user device 304 can be configured to send a request to the first user device 302 while the second user device 304 is in a closed access state.

In some examples, the second user device 304 can sync samples from both the service provider 330 and the first user device 302 simultaneously or at different times. For example, the second user device 304 can sync samples from both the first user device 302 and the service provider 330 at the same time. In another example, the second user device 304 can sync samples from the first user device 302 until the second user device 304 connects to a WAN (for example, the internet) or a LAN (for example, a WiFi network). Once connected to the WAN or LAN, the second user device 304 may begin to sync samples from the service provider 330 instead of the first user device 302.

Figure 4:
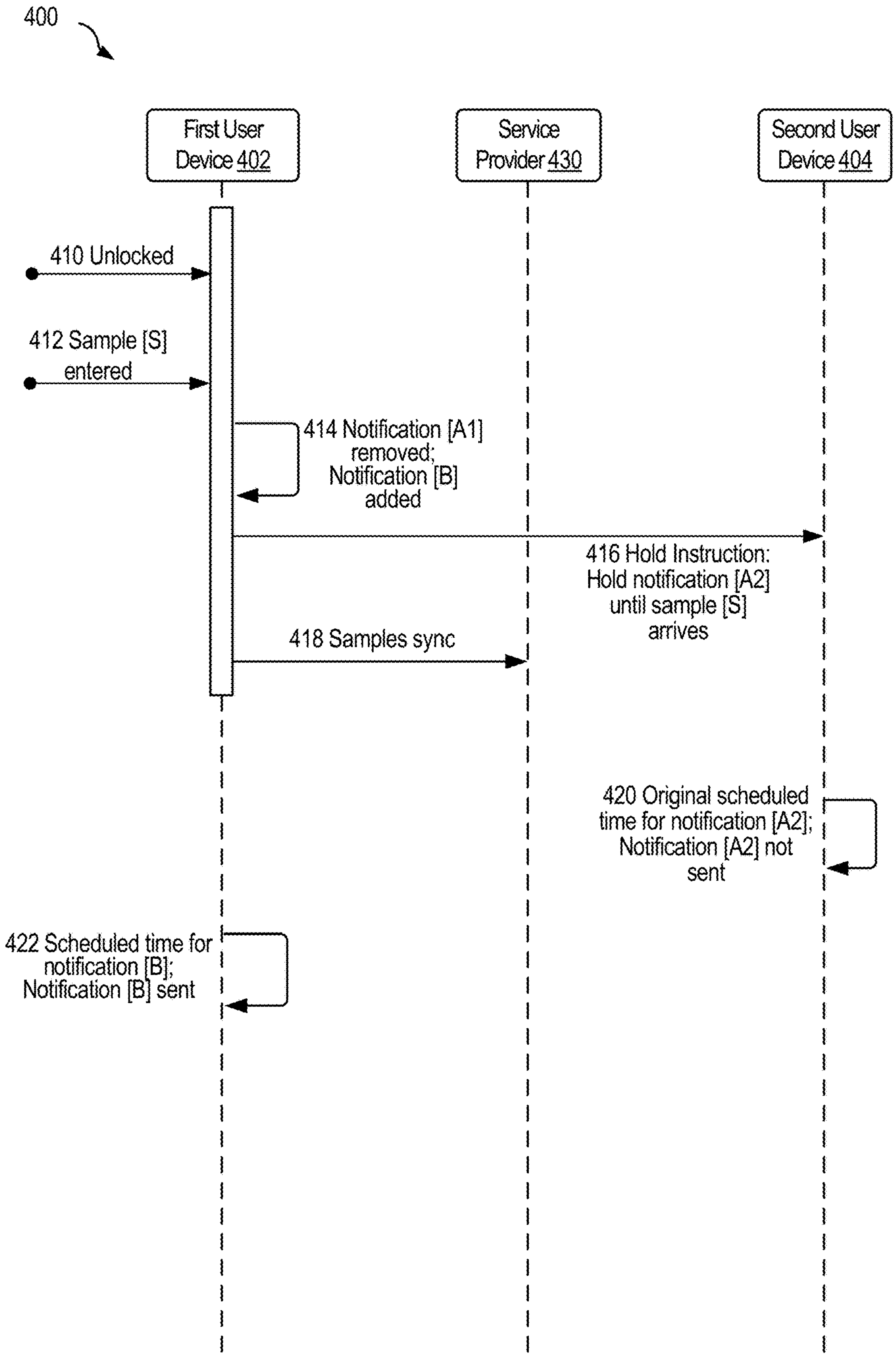
FIG. 4 illustrates a flowchart of a process for synchronizing notifications across multiple devices using a hold instruction, according to at least one example.

FIG. 4 illustrates a flow chart showing a process 400 for a first user device 402 (for example, the first user device 202 of FIG. 2) sending a hold instruction to a second user device 404 (for example, the second user device 204 of FIG. 2) to hold displaying a notification [A2] until the second user device 404 has received sample [S], a piece of health information (for example, the first health information 210 of FIG. 2), according to at least one example. Here, a notification [A1] was removed at the first user device 402 and the notification [A2] corresponds to the notification [A1] as described herein. The hold instruction can prevent the notification [A2] from being displayed at the second user device 404. Additionally, a second notification [B] was added/generated at the first user device 402 based on sample [S]. The process 400 can be performed by the first user device 402, the second user device 404, and the service provider 430 (for example, the service provider 230 of FIG. 2). The process 400 is a variation of the process 200, which includes various functions being performed by the various elements shown in FIGS. 1 and 2.

The process 400 may begin at 410, by the first user device 402 being unlocked from a closed access state. The first user device 402 can be in a closed access state with limited functionality. For example, the first user device 402 may have a lock screen which requires a password or using biometrics to unlock the first user device 402 to gain access to the majority of user device functionality, software, and data including health information.

At 412, the process 400 can include sample [S] being entered at the first user device 402. Sample [S] can be any health information (for example, the health information 210 of FIG. 2) that can be received by the first user device 402. In some examples, sample [S] can be received by a user inputting sample [S] into the first user device 402. In some examples, sample [S] can be obtained via sensors of the first user device 402. In some examples, the sample [S] can be collected from a web server. In some examples, sample [S] can be obtained from a server accessible through a network such as database from a medical provider. In some examples, the sample [S] can be obtained from a gateway for a health database system. In some examples, sample [S] can be received from another user device which received health information. For example, the other user device can be a secondary device or an accessory device such as a watch. In some examples, the another user device can receive health information via user input or via sensors of the another user device.

At 414, the process 400 can include the first user device 402 removing notification [A1] (for example, the first notification as described in relation to FIG. 2) from being displayed at the first user device 402. Instead of rescheduling notification [A1] to be displayed at a different time at the first user device 402, the notification [A1] has been removed from the schedule of being displayed. The first user device 402 removes notification [A1] based at least in part on analyzing sample [S] using an algorithm to determine when to remove notifications on the first user device 402. In some examples, algorithms for rescheduling, removing, and scheduling new notifications can be run periodically or every time one or more samples are received.

Additionally, at (3), the process 400 includes the first user device 402 adding notification [B] to a notification schedule to be displayed at a first time on the first user device 402. The first user device 402 schedules the new notification [B] based at least in part on analyzing sample [S] using an algorithm to determine when to display notifications on the first user device 402. Algorithms for rescheduling, removing, and adding notifications can be similar.

At 416, the process 400 can include the first user device 402 transmitting a hold instruction to the second user device 404. The hold instruction can instruct the second user device 404 to hold notification [A2] until the second user device 404 receives sample [S]. Notification [A2] on the second user device 404 can correspond to notification [A] on the first user device 402. For example, notification [A2] on the second user device 404 can be the same notification category and/or the same notification subcategory as the notification [A1] on the first user device 402. In some examples, notification [A2] on the second user device 404 can have a same notification identifier as notification [A1] on the first user device 402.

In some examples, holding the notification [A2] includes preventing the notification [A] from being displayed on the second user device 404 until notification [A2] has been rescheduled on the second user device 404. In some examples, holding notification [A2] includes preventing notification [A2] from being displayed on the second user device 404 until sample [S] is received. In some examples, holding notification [A2] includes dismissing notification [A2] from being displayed on the second user device 404 until notification [A2] has been rescheduled. In some examples, holding notification [A2] includes dismissing notification [A2] from being displayed on the second user device 404 until sample [S] is received.

At 418, the process 400 can include the first user device 402 syncing samples, including sample [S], to the service provider 430. In some examples, the first user device 202 transmits the samples, including sample [S] to a service provider 230 while the first user device 202 is unlocked from a closed access state. A user device can be in a closed access state with limited functionality. For example, the user device may have a lock screen which requires the password or using biometrics to unlock the user device to gain access to the majority of user device functionality and software. In some examples, the first user device 402 transmits the sampled received at the first user device 402 (including sample [S]) to the service provider 230 at regular intervals, regardless of when the first user device 402 received each sample of the samples. For example, the first user device 402 may transmit all samples received every 10 seconds, every 30 seconds, every 1 minute, every 5 minutes, every 10 minutes, every 20 minutes, every 30 minutes, every 1 hour, every 2 hours, every 3 hours, and the like.

At 420, the process 400 can include the second user device 404 not displaying notification [A2] when the original scheduled time for notification [A2] arrives. In some examples, the second user device 404 deletes or removes notification [A2]. Here, it can be seen that the hold instruction prevents a held notification, namely notification [A2], from being incorrectly displayed at the second user device 404 prior to the second user device 404 receiving sample [S]. In this way, both the first user device 402 and the second user device 404 were consistent in not displaying notification [A2].

At 422, the process 400 can include the first user device 402 displaying notification [B] at the associated scheduled time. Of note, the second user device 404 does not display notification [B] because the second user device 404 has yet to receive sample [S]. In some examples, if the second user device 404 had been unlocked and received sample [S] prior to the scheduled time associated with notification [B], the second user device 404 would have generated notification [B] and displayed notification [B] at the associated schedule time. Here, it can be seen that at least in some examples, the multidevice notification synchronization techniques described herein err on the side of not presenting notifications due to having a lack of updated information.

Figure 5:
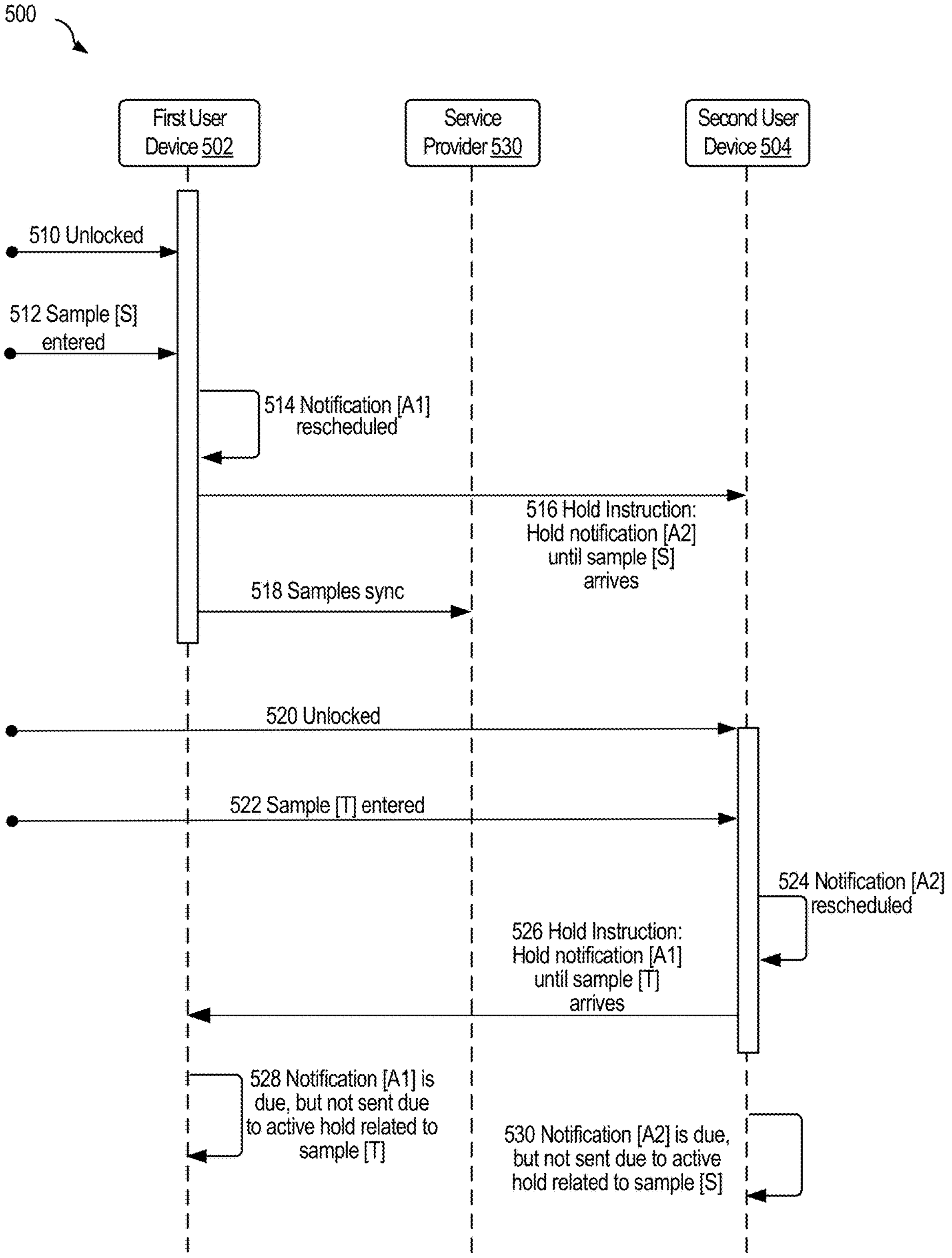
FIG. 5 illustrates a flowchart of a process for synchronizing notifications across multiple devices using a hold instruction, according to at least one example.

FIG. 5 illustrates a flow chart showing a process 500 for a first user device 502 (for example, the first user device 202 of FIG. 2) sending a hold instruction to a second user device 504 (for example, the second user device 204 of FIG. 2) to hold displaying a notification [A2] until the second user device 504 has received sample [S], a piece of health information (for example, the first health information 210 of FIG. 2), according to at least one example. Notification [A2] is associated with notification [A1], a notification scheduled to be displayed on the first user device 302. The process 500 can be performed by the first user device 502, the second user device 504, and the service provider 530 (for example, the service provider 230 of FIG. 2). The process 500 is a variation of the process 200, which includes various functions being performed by the various elements shown in FIGS. 1 and 2.

The process 500 may begin at 510, by the first user device 502 being unlocked from a closed access state. The first user device 502 can be in a closed access state with limited functionality. For example, the first user device 502 may have a lock screen which requires a password or using biometrics to unlock the first user device 502 to gain access to the majority of user device functionality, software, and data including health information.

At 512, the process 500 can include sample [S] being entered at the first user device 502. Sample [S] can be any health information (for example, the health information 210 of FIG. 2) that can be received by the first user device 502. In some examples, sample [S] can be received by a user inputting sample [S] into the first user device 502. In some examples, sample [S] can be obtained via sensors of the first user device 502. In some examples, the sample [S] can be collected from a web server. In some examples, sample [S] can be obtained from a server accessible through a network such as database from a medical provider. In some examples, the sample [S] can be obtained from a gateway for a health database system. In some examples, sample [S] can be received from another user device which received health information. For example, the other user device can be a secondary device or an accessory device such as a watch. In some examples, the another user device can receive health information via user input or via sensors of the another user device.

At 514, the process 500 can include the first user device 502 rescheduling notification [A1](for example, the first notification as described in relation to FIG. 2). Prior to the rescheduling of notification [A1], notification [A1] was scheduled to be displayed on the first user device 502 at a first time. After receiving sample [S], the first user device 502 reschedules notification [A1] to be displayed at a second time. The first user device 502 reschedules notification [A1] based at least in part on analyzing sample [S] using an algorithm to determine when to display notification [A1] on the first user device 502. For example, the first user device can run the algorithm for scheduling notification [A1] using sample [S] to determine that notification [A1] should be displayed on the first user device 502 at a second time. In some examples, the second time is not the same as the first time. In some examples, the second time is earlier than the first time. In some examples, the second time is later than the first time.

At 516, the process 500 can include the first user device 502 transmitting a hold instruction to the second user device 504. The hold instruction can instruct the second user device 504 to hold notification [A2] until the second user device 504 receives sample [S]. Notification [A2] on the second user device 504 can correspond to notification [A1] on the first user device 502. For example, notification [A2] on the second user device 504 can be the same notification category and/or the same notification subcategory as the notification [A 1] on the first user device 502. In some examples, notification [A2] on the second user device 504 can have a same notification identifier as notification [A1] on the first user device 502.

In some examples, holding the notification [A2] includes preventing the notification [A2] from being displayed on the second user device 504 until notification [A2] has been rescheduled on the second user device 504. In some examples, holding notification [A2] includes preventing notification [A2] from being displayed on the second user device 504 until sample [S] is received. In some examples, holding notification [A2] includes dismissing notification [A2] from being displayed on the second user device 504 until notification [A2] has been rescheduled. In some examples, holding notification [A2] includes dismissing notification [A2] from being displayed on the second user device 504 until sample [S] is received.

At 518, the process 500 can include the first user device 502 syncing samples, including sample [S], to the service provider 530. In some examples, the first user device 202 transmits the samples, including sample [S] to a service provider 230 while the first user device 202 is unlocked from a closed access state. A user device can be in a closed access state with limited functionality. For example, the user device may have a lock screen which requires the password or using biometrics to unlock the user device to gain access to the majority of user device functionality and software. In some examples, the first user device 502 transmits the sampled received at the first user device 502 (including sample [S]) to the service provider 230 at regular intervals, regardless of when the first user device 502 received each sample of the samples. For example, the first user device 502 may transmit all samples received every 10 seconds, every 30 seconds, every 1 minute, every 5 minutes, every 10 minutes, every 20 minutes, every 30 minutes, every 1 hour, every 2 hours, every 3 hours, and the like.

At 520, the process 500 can include the second user device 504 being unlocked from a closed access state. The second user device 504 can be in a closed access state with limited functionality. For example, the second user device 504 may have a lock screen which requires a password or using biometrics to unlock the first user device 502 to gain access to the majority of user device functionality, software, and data including health information.

At 522, the process 500 can include sample [T] being entered at the second user device 504. Sample [T] can be any health information (for example, the health information 210 of FIG. 2) that can be received by the second user device 504. In this example, sample [T] is not the same as sample [S], but sample [T] and sample [S] both affect notification [A1] of the first user device 502 and notification [A2] of the second user device 504 as described herein. For example, the algorithms for scheduling, rescheduling, removing, and adding notification [A1] and notification [A2] can use sample [T] and sample [S]. In this example, sample [T] is entered at the second user device 504 and not at the first user device 502. Likewise, sample [S] is entered at the first user device 502 and not the second user device 504. In some examples, sample [T] can be received by a user inputting sample [T] into the second user device 504. In some examples, sample [T] can be obtained via sensors of the second user device 504. In some examples, the sample [T] can be collected from a web server. In some examples, sample [T] can be obtained from a server accessible through a network such as database from a medical provider. In some examples, the sample [T] can be obtained from a gateway for a health database system. In some examples, sample [T] can be received from another user device which received health information. For example, the other user device can be a secondary device or an accessory device such as a watch. In some examples, the another user device can receive health information via user input or via sensors of the another user device.

At 524, the process 500 can include the second user device 504 rescheduling notification [A2] (for example, the first notification as described in relation to FIG. 2). Prior to the rescheduling of notification [A2], notification [A2] was scheduled to be displayed on the second user device 504 at a third time. After receiving sample [T], the second user device 504 reschedules notification [A2] to be displayed at a fourth time. The second user device 504 reschedules notification [A2] based at least in part on analyzing sample [T] using an algorithm to determine when to display notification [A2] on the second user device 504. For example, the second user device can run the algorithm for scheduling notification [A2] using sample [T] to determine that notification [A2] should be displayed on the second user device 504 at a fourth time. In some examples, the fourth time is not the same as the third time. In some examples, the fourth time is earlier than the third time. In some examples, the fourth time is later than the third time.

At 526, the process 500 can include the second user device 504 transmitting a hold instruction to the first user device 502. The hold instruction can instruct the first user device 502 to hold notification [A1] until the first user device 502 receives sample [T]. As noted before, notification [A2] on the second user device 504 can correspond to notification [A1] on the first user device 502. For example, notification [A2] on the second user device 504 can be the same notification category and/or the same notification subcategory as the notification [A1] on the first user device 502. In some examples, notification [A2] on the second user device 504 can have a same notification identifier as notification [A1] on the first user device 502.

In some examples, holding the notification [A1] includes preventing the notification [A1] from being displayed on the first user device 502 until notification [A1] has been rescheduled on the first user device 502. In some examples, holding notification [A1] includes preventing notification [A1] from being displayed on the first user device 502 until sample [T] is received. In some examples, holding notification [A1] includes dismissing notification [A1] from being displayed on the first user device 502 until notification [A1] has been rescheduled. In some examples, holding notification [A1] includes dismissing notification [A1] from being displayed on the first user device 502 until sample [T] is received.

At 528, the process can include the first user device 502 not displaying notification [A1] when the scheduled time for notification [A1] arrives. Here, notification [A1] is due, but notification [A1] is not sent due to the active hold instruction from the second user device 504 related to sample [T]. As with relation to 514, notification [A1] was rescheduled based on sample [S]. However, the hold instruction from the second user device 504 is preventing notification [A1] from being displayed until the first user device 502 receives sample [T].

In some examples, the first user device 502 deletes or removes notification [A1]. Here, it can be seen that the hold instruction from the second user device 504 prevents a held notification, notification [A1], from being incorrectly displayed at the first user device 504 prior to the first user device 502 receiving sample [T]. In this way, both the first user device 402 and the second user device 404 were consistent in not displaying notification [A2].

At 530, the process can include the second user device 504 not displaying notification [A2] when the original scheduled time for notification [A2] arrives. Here, notification [A2] is due, but notification [A2] is not sent due to the active hold instruction from the first user device 502 related to sample [S]. Note that the schedule for notification [A1] as described in relation to 528 can be different than the schedule for notification [A2] described here. This can demonstrate how sample [S] and sample [T] affect the schedule for notification [A1] and notification [A2] differently. As with relation to 524, notification [A2] was rescheduled based on sample [T]. However, the hold instruction from the first user device 502 is preventing notification [A2] from being displayed until the second user device 504 receives sample [S].

In some examples, the second user device 504 deletes or removes notification [A2]. Here, it can be seen that the hold instruction prevents a held notification, notification [A2], from being incorrectly displayed at the second user device 504 prior to the second user device 504 receiving sample [S].

Having neither notification [A1] display at the first user device 502 nor notification [A2] display at the second user device 504 can be described as a deadlock. Both the first user device 502 and the second user device 504 err on the side of not displaying a notification until they receive all pertinent information, namely both sample [S] and sample [T]. Using the first user device 502 as an example, if the first user device 502 did receive sample [T] from the service provider 530, the first user device 502 could potentially reschedule the notification [A1] based on both sample [S] and sample

[T]. However, in some examples, receiving sample [T] at the first user device 502 would not require notification [A1] to be rescheduled.

Figure 6:
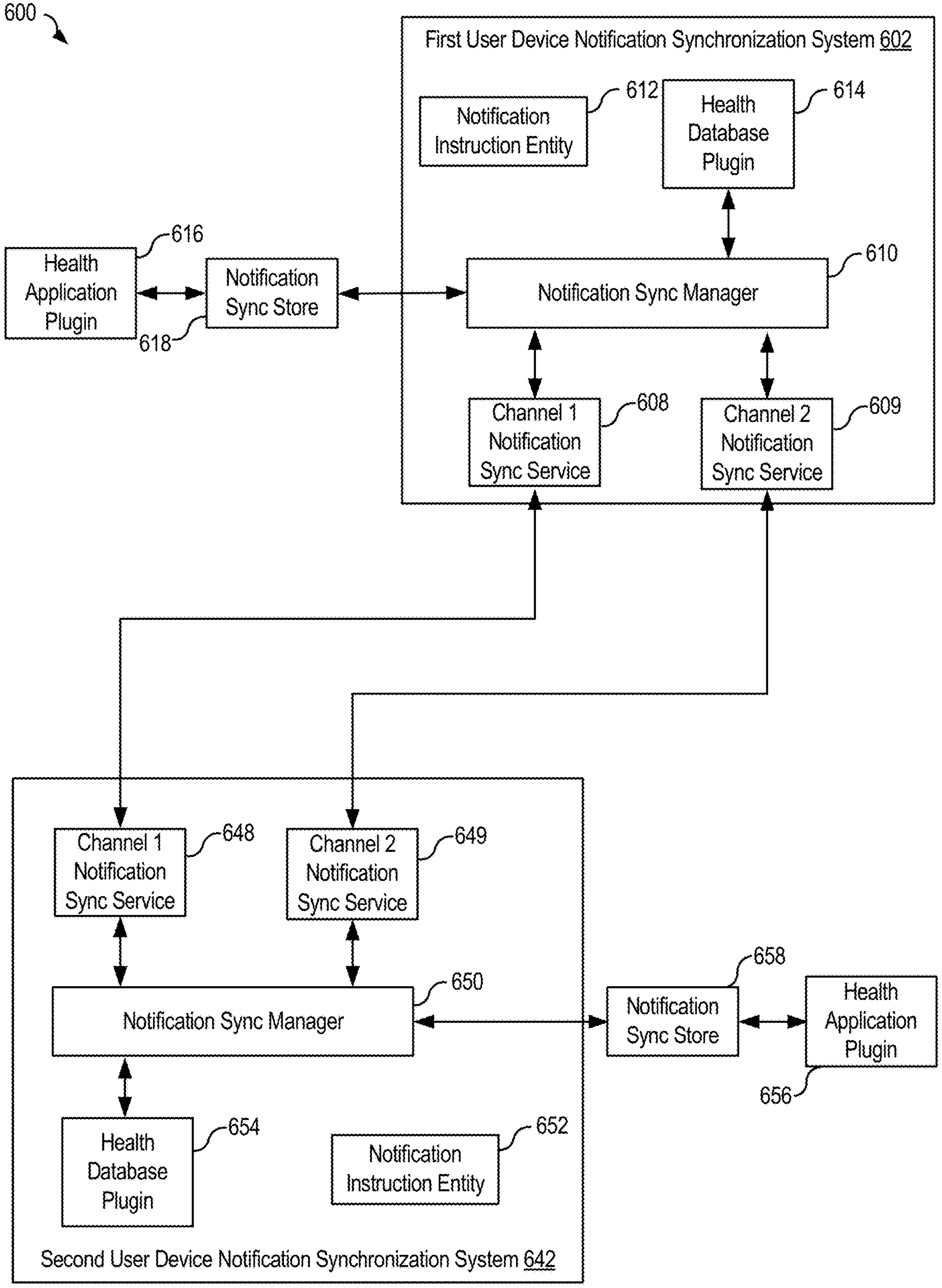
FIG. 6 illustrates a block diagram for software components on user devices for synchronizing notifications across multiple devices, according to at least one example.

FIG. 6 illustrates a block diagram 600 for software modules and/or services between user devices for managing multidevice notification synchronization, according to at least one example. For example, user device 202 of FIG. 2 and user device 204 of FIG. 2 include these software modules and/or services. The first user device notification synchronization system 602 represents the application on a first user device that manages the notification synchronization methods and techniques described herein. The first user device notification synchronization system 602 includes a channel 1 notification sync service 608, a channel 2 notification sync service 609, a notification sync manager 610, a notification instruction entity 612, and a health database plugin 614 (for example, a health information datastore). A health application plugin 616 communicates with the notification sync store 618 which serves as the interface to the notification sync manager 610. The health application plugin 616 represents any health application on the user device that would like to use the features of the first user device notification synchronization system 602. A second user device can include similar software modules and/or services as the first user device. The second user device can include a second user device notification synchronization system 642 with corresponding second channel 1 notification sync service 648, second channel 2 notification sync service 649, second notification sync manager 650, second health database plugin 654, and second notification instruction entity 652. The second user device also includes a second notification sync store 658 second health application plugin 656. As described herein, the functionality of the respective software modules and/or services for the first user device and the second user device are similar.

The notification sync manager 610 persists notification instructions via the notification instruction entity 612. For example, with reference to FIG. 2, when the second user device 204 receives the hold instruction from the first user device 202, the hold instruction can be stored in the second notification instruction entity 652 of the second user device notification synchronization system 642 of the second user device 204. For example, the hold instruction can be stored until the hold instruction is no longer valid or the associated first health information 210 is received by the second user device 204.

The notification sync manager 610 also validates and prunes notification instructions. For example, the notification sync manager 610 determines if a hold instruction is valid based on the expiration date and criteria associated with the hold instruction as described herein. If the hold instruction is no longer valid, the hold instruction can be pruned (for example, deleted). The notification sync manager 610 can validate a hold instruction whenever a client application (for example, a health application using the notification synchronization system 602) queries the notification synchronization system 602 for stored notification instructions. The notification sync manager 610 can also validate notification instructions periodically based on ongoing signals such as when the user device unlocks. The notification sync manager 610 is able to gain access to the health information stored on the user device through the health database plugin 614. The health database plugin 614 represents any health information database on the user device.

The notification sync manager 610 can also send notification instructions to other user devices (for example, user devices 104, 106 of FIG. 1) and a service provider (for example, service provider 130 of FIG. 1) by sending the instructions to one or both of the channel 1 notification sync service 608 and the channel 2 notification sync service 609. The channel 1 notification sync service 608 transmits and receives instructions via a first channel as described in relation to FIG. 3. The channel 2 notification channel 609 transmits and receives instructions via a second channel as described in relation to FIG. 3. For example, a first channel can be the internet while the second channel can be a device-to-device communication channel such as a Bluetooth channel. The first channel and the second channel can be any suitable channel for transmitting data between devices as described in relation to FIG. 3. Although a channel 1 notification sync service 608 and a channel 2 notification sync service 609 are shown here, any number of channels with corresponding notification sync services can be used to transmit and receive instructions.

The channel 1 notification sync service 608 and the channel 2 notification sync service provide an interface for using the peer-to-peer messaging framework to the notification synchronization system 602. For example, with reference to FIG. 2, when the first user device 202 determines that a hold instruction should be sent to the second user device 204, the notification sync manager 610 can send the hold instruction to the channel 1 notification sync service 608 which communicates the hold instruction through the peer-to-peer messaging framework. Likewise, the notification sync manager 610 receives messages from the channel 1 notification sync service 608 that contain instructions from another device for client applications. The notification sync manager 610 can then route the instructions to the correct client application.

As described above in relation to FIG. 3, the second user device 204 can receive a hold instruction via both the first channel at the channel 1 notification sync service 648 and the second channel at the channel 2 notification sync service 649. The second notification sync manager 650 can determine that the hold instruction received via the first channel and the hold instruction second channel represent the same hold instruction and one of the hold instructions can be discarded or otherwise deleted rather than stored in the notification instruction entity 652.

Figure 7:
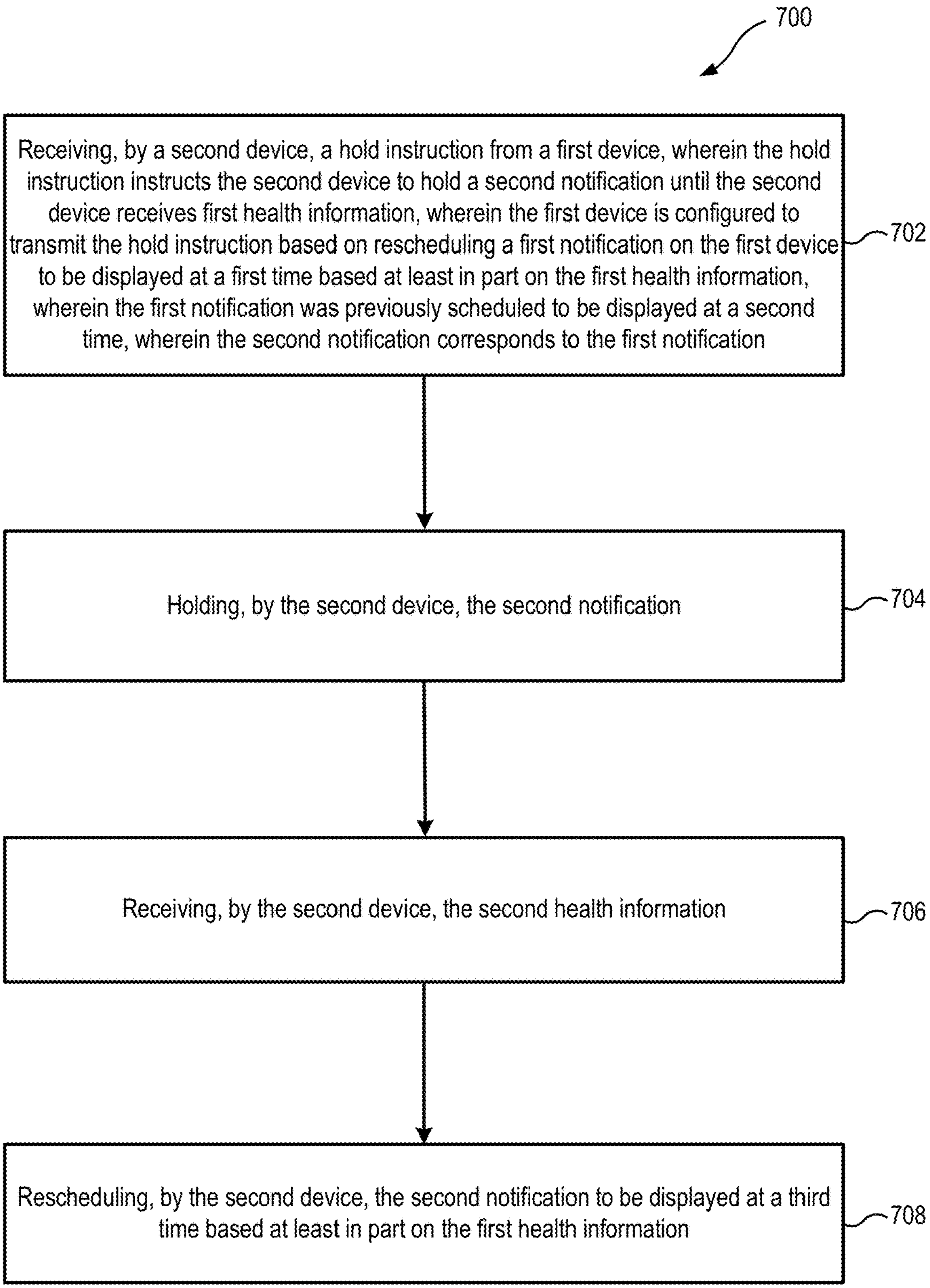
FIG. 7 illustrates a flowchart of a process for synchronizing notifications across multiple devices using a hold instruction, according to at least one example.

FIG. 7 illustrates a flowchart of a process 700 for a second device (for example, the second user device 204 of FIG. 2) receiving a hold instruction, according to at least one example. When the second device receives the hold instruction from a first device (for example, the first user device 202 of FIG. 2), the second device can hold a notification or notifications of a particular notification category until the second device receives first the health information (for example, the first health information 210 of FIG. 2). A health application 1110 (FIG. 11), whether embodied in a wearable electronic device 1105 (FIG. 11), a user device 1102 (FIG. 11), or a service provider computer 1104 (FIG. 11), or any suitable combination of the foregoing may perform the process 700 of FIG. 7. Thus, while the process 700 is described as being performed by the user device (for example, the second user device 204 of FIG. 2), it should be understood that other user devices (e.g., the wearable user device) may perform the process 700 with limited adjustments.

The process 700 can begin at block 702 by a second device receiving a hold instruction from a first device (for example, the first user device 202 of FIG. 2). The hold instruction can instruct the second device to hold a first notification until the second device receives first health information. The first device can be configured to transmit the hold instruction based on rescheduling a first notification on the first device to be displayed at a first time based at least in part on the first health information. The first notification can have been previously scheduled to be displayed at a second time. The second notification can correspond to the first notification. For example, the second notification can correspond to the first notification based on the first notification being of the same notification category and/or the same notification subcategory as the second notification. The hold instruction can include a notification category such that the second device holds notifications of the notification category. In some examples, the hold instruction includes an expiration date and the process 700 includes the second device determining that the expiration date of the hold instruction has not elapsed. In some examples, the hold instruction includes one or more criterion and the process 700 includes the second device determining that the one or more criteria have been met. For example, criteria can include custom data objects that can be interpreted by an application to determine if the criteria is met. In some examples, the criteria can also include an indication that the hold instruction is no longer valid as soon as health data is considered consistent on the second user device 204 with other user devices and/or the service provider 230. In some examples, the criteria can also be that the hold instruction is valid until the first health information 210 arrives.

At block 704, the process 700 can include the second device holding the second notification. In some examples, holding the second notification includes preventing the second notification from being displayed on the second device until the second notification has been rescheduled. In some examples, holding the second notification includes preventing the second notification from being displayed on the second device until the first health information is received. In some examples, holding the second notification includes dismissing the second notification from being displayed on the second device until the second notification has been rescheduled. In some examples, holding the second notification includes dismissing the second notification from being displayed on the second device until the first health information is received.

At block 706, the process 700 can include the second device receiving the first health information. In some examples, the second device receives the first health information from a service provider (for example, the service provider 130 of FIG. 1), wherein the first device is configured to transmit the first health information to the service provider. In some examples, the process 700 includes the second device transmitting a request for the first health information to the service provider. In some examples, the process 700 includes the second device transmitting a request for any updates to health information to the service provider. In some examples, the process 700 includes, prior to receiving the first health information, unlocking the second device from a closed access state. When the second device is in a closed access state, the second device has limited functionality such as emergency functionality and functionality to receive unlock information in order to unlock from the closed access state. Unlocking the second device from a closed access state can include a user using a password, a key, or biometrics to unlock the second device from a closed access state.

At block 708, the process 700 can include the second device rescheduling the second notification to be displayed at a third time based at least in part on the first health information. In some examples, the third time can be the same as the first time. The third time can be determined based on the algorithm used to determine when a notification should be scheduled to be displayed. In some examples, the second notification was previously scheduled to be displayed at a fourth time where the fourth time and the third time are not the same.

Figure 8:
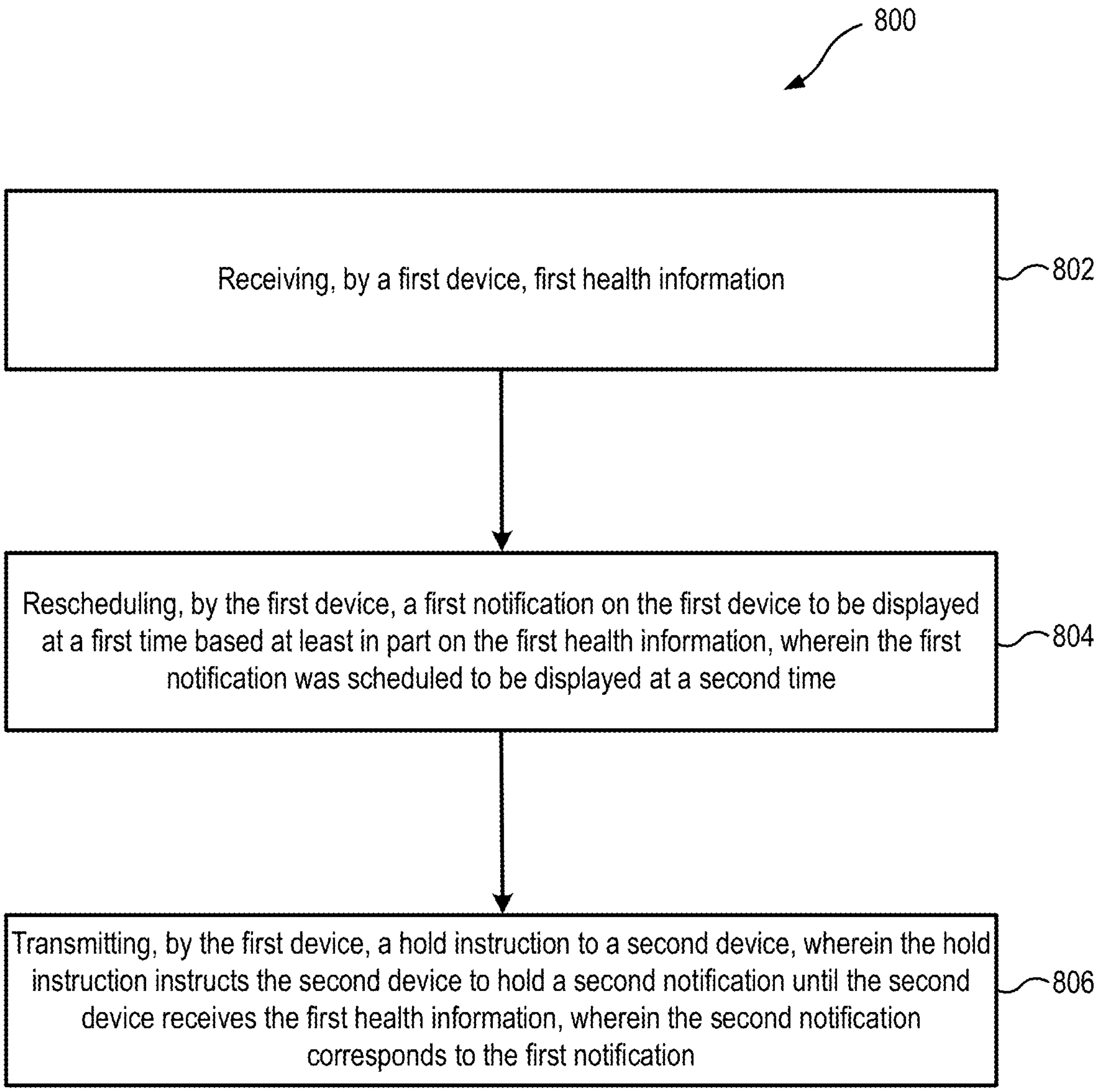
FIG. 8 illustrates a flowchart of a process for synchronizing notifications across multiple devices using a hold instruction, according to at least one example.

FIG. 8 illustrates a flowchart of a process 800 for a first device (for example, the first user device 202 of FIG. 2) sending a hold instruction, according to at least one example. The first device can send the hold instruction to a second device (for example, the second user device 204 of FIG. 2) which can cause the second device to hold a notification or notifications of a particular notification category until the second device receives the first health information (for example, the first health information 210 of FIG. 2). A health application 1110 (FIG. 11), whether embodied in a wearable electronic device 1105 (FIG. 11), a user device 1102 (FIG. 11), or a service provider computer 1104 (FIG. 11), or any suitable combination of the foregoing may perform the process 800 of FIG. 8. Thus, while the process 800 is described as being performed by the user device, it should be understood that other user devices (e.g., the wearable user device) may perform the process 800 with limited adjustments.

The process 800 can begin at block 802 by a first device receiving first health information. In some examples, the first health information can be received by a user inputting the first health information into the first device. In some examples, the first health information can be obtained via sensors of the first device. In some examples, the first health information can be collected from a web server. In some examples, the first health information can be obtained from a server accessible through a network such as database from a medical provider. In some examples, the first health information can be obtained from a gateway for a health database system. In some examples, the first health information can be received from another user device which received health information. For example, the other user device can be a secondary device or an accessory device such as a watch. In some examples, the another user device can receive health information via user input or via sensors of the another user device.

At block 804, the process 800 can include the first device rescheduling a first notification on the first device to be displayed at a first time based at least in part on the first health information. For example, the first device can run the algorithm for scheduling the first notification wherein the algorithm can use the first health information. In some examples, the first notification was scheduled to be displayed at a second time.

At block 806, the process 800 can include the first device transmitting a hold instruction to a second device (for example, the second user device 204 of FIG. 2). The hold instruction can instruct the second device to hold a second notification until the second device receives the first health information. The second device can be configured to reschedule the second notification to be displayed at a third time based at least in part on the first health information. For example, the second device can run the algorithm for scheduling the second notification wherein the algorithm can use the first health information. In some examples, the second notification was previously scheduled to be displayed at a fourth time, wherein the fourth time and the third time are not the same. The second notification can correspond to the first notification. In some examples, holding the first notification includes preventing the first notification from being displayed on the second device until the second notification has been rescheduled. In some examples, holding the second notification includes preventing the second notification from being displayed on the second device until the first health information is received. In some examples, holding the second notification includes dismissing the second notification from being displayed on the second device until the second notification has been rescheduled. In some examples, holding the second notification includes dismissing the second notification from being displayed on the second device until the first health information is received.

In some examples, the hold instruction can include a notification category instructing the second device to hold notifications of the notification category. In some examples, the hold instruction instructs the second device to hold notifications of the notification category until the second device receives the first health information. In some examples, holding notifications of the notification category includes preventing notifications of the notification category from being displayed on the second device until the first health information is received. In some examples, holding notifications of the notification category includes dismissing notifications of the notification category from being displayed on the second device until the first health information is received.

In some examples, the hold instruction includes an expiration date and the second device is configured to determine that the expiration date of the hold instruction has not elapsed. In some examples, the hold instruction includes one or more criterion, and the second device is configured to determine that the one or more criteria have been met.

In some examples, the process 800 can include the first device transmitting the first health information to a service provider (for example, the service provider 130 of FIG. 1). The service provider can be configured to transmit the first health information to the second device. In some examples, the second device can be configured to transmit a request for the first health information to the service provider. In some examples, the second device can be configured to transmit a request for any updates to health information to the service provider. In some examples, the second device can be configured to be unlocked from a closed access state and, after being unlocked from the closed access state, transmit a request for the first health information to the service provider.

Figure 9:
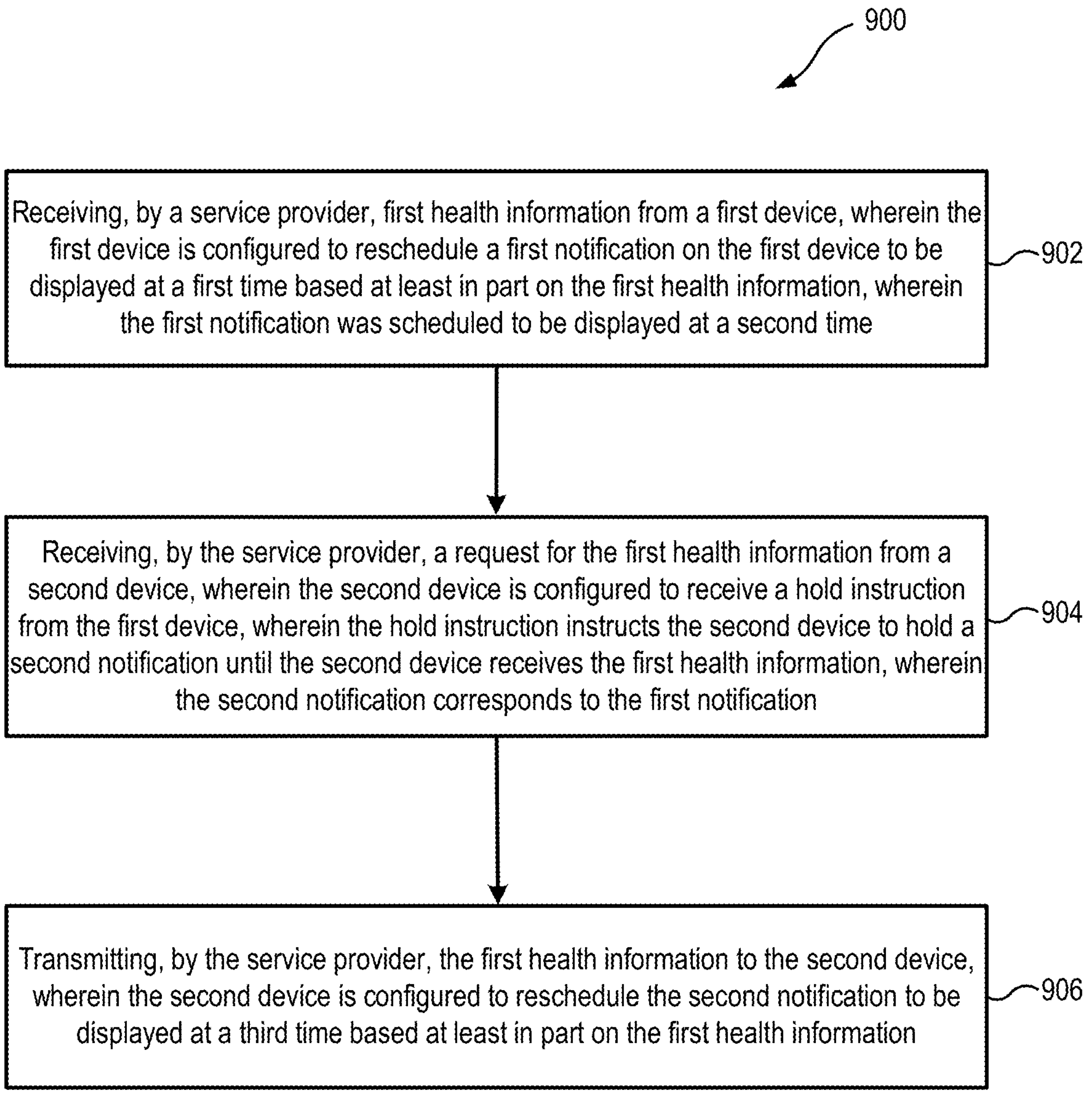
FIG. 9 illustrates a flowchart of a process for synchronizing notifications across multiple devices using a hold instruction, according to at least one example.

FIG. 9 illustrates a flowchart of a process 900 for a service provider (for example, the service provider 130 of FIG. 1) receiving health information, according to at least one example. The service provider can transmit the first health information (for example, the first health information 210 of FIG. 2) to a second device (for example, the second user device 204 of FIG. 2). After receiving a hold instruction from the first device (for example, the first user device 202 of FIG. 2) the second device can hold a notification or notifications of a particular notification category until the second device receives first the health information (for example, the first health information 210 of FIG. 2). The process 900 begins at block 902 by the service provider receiving first health information from a first device (for example, the first user device 202 of FIG. 2). The first device can be configured to reschedule a first notification on the first device to be displayed at a first time based at least in part on the first health information. For example, the first device can run the algorithm for scheduling the first notification wherein the algorithm can use the first health information. The first notification can have been scheduled to be displayed at a second time.

At block 904, the process 900 includes the service provider receiving a request for the first health information from a second device (for example, the second user device 204 of FIG. 2). The second device can be configured to receive a hold instruction from the first device. The hold instruction can instruct the second device to hold a second notification until the second device receives the first health information. The second notification can correspond to the first notification. For example, the second notification can correspond to the first notification based on the first notification being of the same notification category and/or the same notification subcategory as the second notification. In some examples, the second device can be configured to be unlocked from a closed access state and, after being unlocked from the closed access state, transmit the request for the first health information to the service provider.

In some examples, holding the second notification includes preventing the second notification from being displayed on the second device until the first health information is received. In some examples, holding the second notification includes dismissing the second notification from being displayed on the second device until the second notification has been rescheduled. In some examples, holding the second notification includes dismissing the second notification from being displayed on the second device until the first health information is received.

In some examples, the hold instruction can include a notification category instructing the second device to hold notifications of the notification category. In some examples, the hold instruction instructs the second device to hold notifications of the notification category until the second device receives the first health information. In some examples, holding notifications of the notification category includes preventing notifications of the notification category from being displayed on the second device until the first health information is received. In some examples, holding notifications of the notification category includes dismissing notifications of the notification category from being displayed on the second device until the first health information is received.

In some examples, the hold instruction includes an expiration date and the second device is configured to determine that the expiration date of the hold instruction has not elapsed. In some examples, the hold instruction includes one or more criteria, and the second device is configured to determine that the one or more criterion have been met.

At block 906, the process 900 includes the service provider transmitting the first health information to the second device. The second device can be configured to reschedule the second notification to be displayed at a third time based at least in part on the first health information. For example, the second device can run the algorithm for scheduling the first notification wherein the algorithm can use the first health information. In some examples, the second notification was previously scheduled to be displayed at a fourth time, wherein the fourth time and the third time are not the same.

Figure 10:
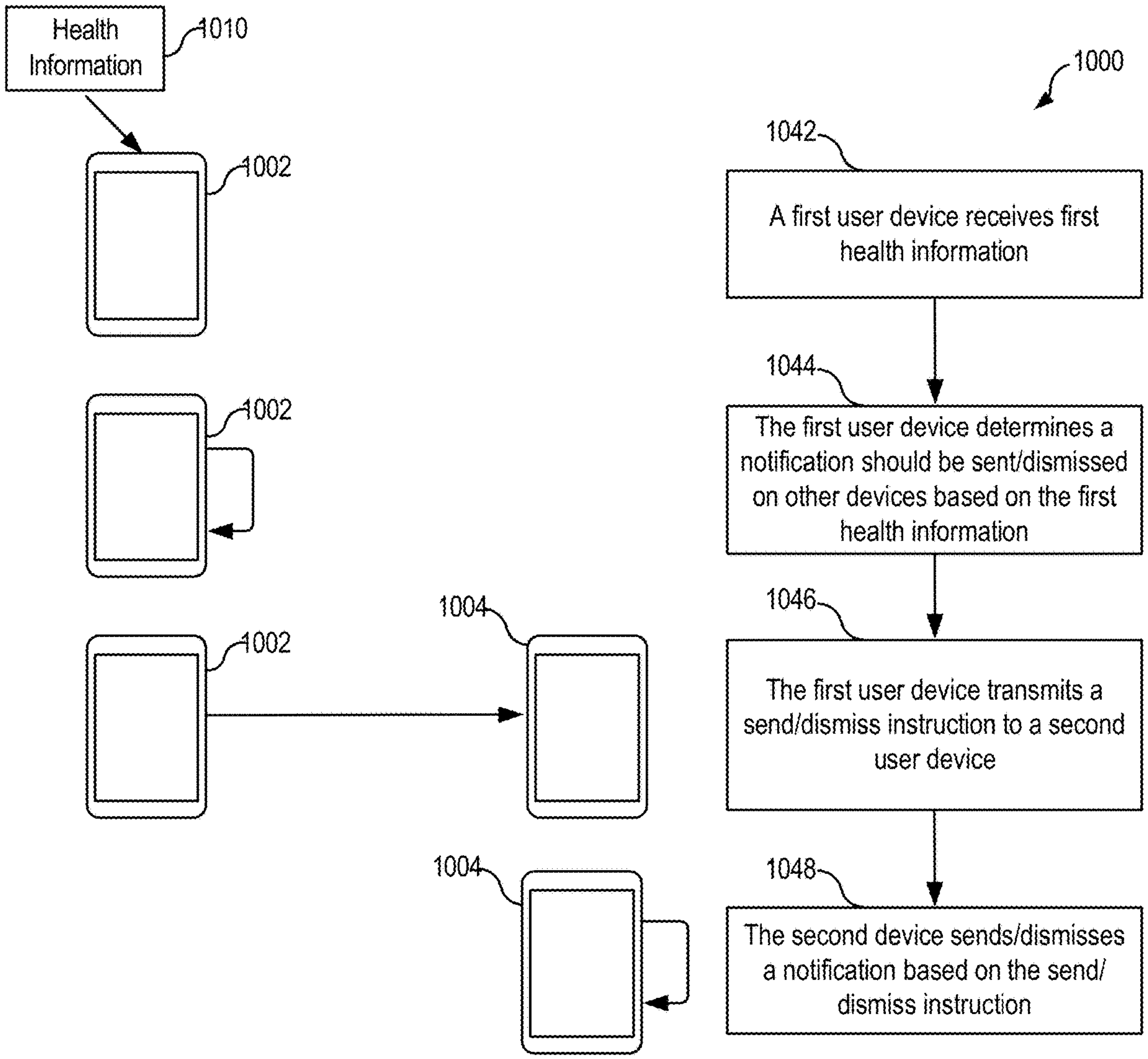
FIG. 10 illustrates a block diagram and a flow chart of a process for multidevice notification synchronization, according to at least one example.

FIG. 10 illustrates a block diagram and a flow chart of a process 1000 for multidevice notification synchronization, according to at least one example. The diagram includes the first user device 1002 (for example, user device 102 of FIG. 1), a second user device 1004 (for example, user device 104 of FIG. 1). The first user device 1002 and the second user device 1004 are associated with an account (or profile) of the user. In some examples, the account can be associated with health information and/or other information.

The process 1000 begins at block 1042 by the first user device 1002 receiving health information 1010. In some examples, the health information 1010 can be health information input by a user of the first user device 1002 or it can be health information received by the first user device 1002 via sensors. In some examples, the health information 1010 can be analysis information based on health information input by a user of the first user device 1002 or it can be health information received by the first user device 1002 via sensors. Example health information input by a user includes logs for medication taken, menstrual cycles, weight, caloric and nutritional intake, and other types of health information that the user self-reports. Example health information received via sensors includes heart rate, blood oxygen, step tracking, and other types of health information that the user device can obtain via sensors on the user device.

At block 1044, the first user device 1002 determines a notification or notifications of a specific notification category and/or subcategory should be sent or dismissed on other devices associated with the account based on the first health information 1010. In some examples, an algorithm on the first user device 1002 (for example, an algorithm in a health application) for scheduling a notification can use the health information 1010 to determine that the notification or notifications should be sent or dismissed. Determining that a notification or specific notification category and/or subcategory should be sent means that the device should display a notification. Determining that a notification or specific notification category and/or subcategory should be dismissed means that the device should not display and/or delete a notification. In some examples, dismissing a notification or specific notification category and/or subcategory means to unschedule a notification or notifications of a specific notification category and/or subcategory such that the notification will not display at a later time.

When the first user device 1002 receives the first health information 1010, software on the first user device 1002 (for example, a health application) can determine that new health information has been received on the first user device 1002. The first user device 1002 can determine if the first health information 1010 is relevant to any notifications scheduled to display on the first user device. For example, the first user device 1002 can determine the first health information 1010 is relevant to a first notification scheduled to display on the first user device 1002 at a first time. The first user device 1002 can determine the first notification should be sent or dismissed on the first user device 1002 based on the first health information.

At block 1046, the first user device 1002 transmits a send or dismiss instruction to a second user device 1004. When the first user device 1002 transmits the send or dismiss instruction to the second user device 1004, the send or dismiss instruction can be sent over a peer-to-peer messaging framework. The peer-to-peer messaging framework allows for transmission of the hold instruction over a variety of types of connections. For example, the peer-to-peer messaging framework can enable the first user device 1002 to transmit the hold instruction to the second user device 1004 over a short-range communication medium such as Bluetooth or near field communications. Likewise, the peer-to-peer messaging framework can enable the first user device 1002 to transmit the hold instruction to the second user device 1004 over a medium-range communication medium such as WiFi or any type of local area network, the peer-to-peer messaging framework can enable the first user device 1002 to transmit the hold instruction to the second user device 1004 over a network-based communication medium such as a wide area network or through a service provider (for example, the service provider 230 of FIG. 2). Such a peer-to-peer messaging framework allows for quick transmission of instructions on the same order as transmission of text messages through a texting application or the like. Likewise, any instruction described herein (for example, the send instruction or dismiss instruction) can be transmitted over the peer-to-peer messaging framework.

At block 1048, the second user device 1004 can send or dismiss a notification based on the send instruction or dismiss instruction. The send instruction can cause the second user device 1004 to send a specific notification. For example, the send instruction can cause the second user device 1004 to display a specific notification. In some examples, the send instruction includes the specific notification to send. In some examples, the send instruction identifies a specific notification to be sent.

In some examples, the dismiss instruction can cause the second user device 1004 to dismiss a specific notification. For example, the dismiss instruction can cause the second user device 1004 to delete and/or not display a specific notification. In some examples, the dismiss instruction can cause the second user device 1004 to dismiss one or more notifications of a specific category and/or specific subcategory. For example, the dismiss instruction can cause the second user device 1004 to delete and/or not display one or more notifications of a specific category and/or specific subcategory. In some examples, the dismiss instruction can cause the second user device 1004 to delete one or more scheduled notifications that are yet to be displayed on the second user device 1004. For example, the dismiss instruction can cause the second user device 1004 to delete a scheduled notification.

In some examples, the second user device 1004 can store a send instruction or dismiss instruction until an expiration date. In some examples, the second user device 1004 can store a send instruction or dismiss instruction until one or more criteria are met. In some examples, the second user device 1004 does not store a send or dismiss instruction, but simply carries out the instruction and deletes the instruction.

Figure 11:
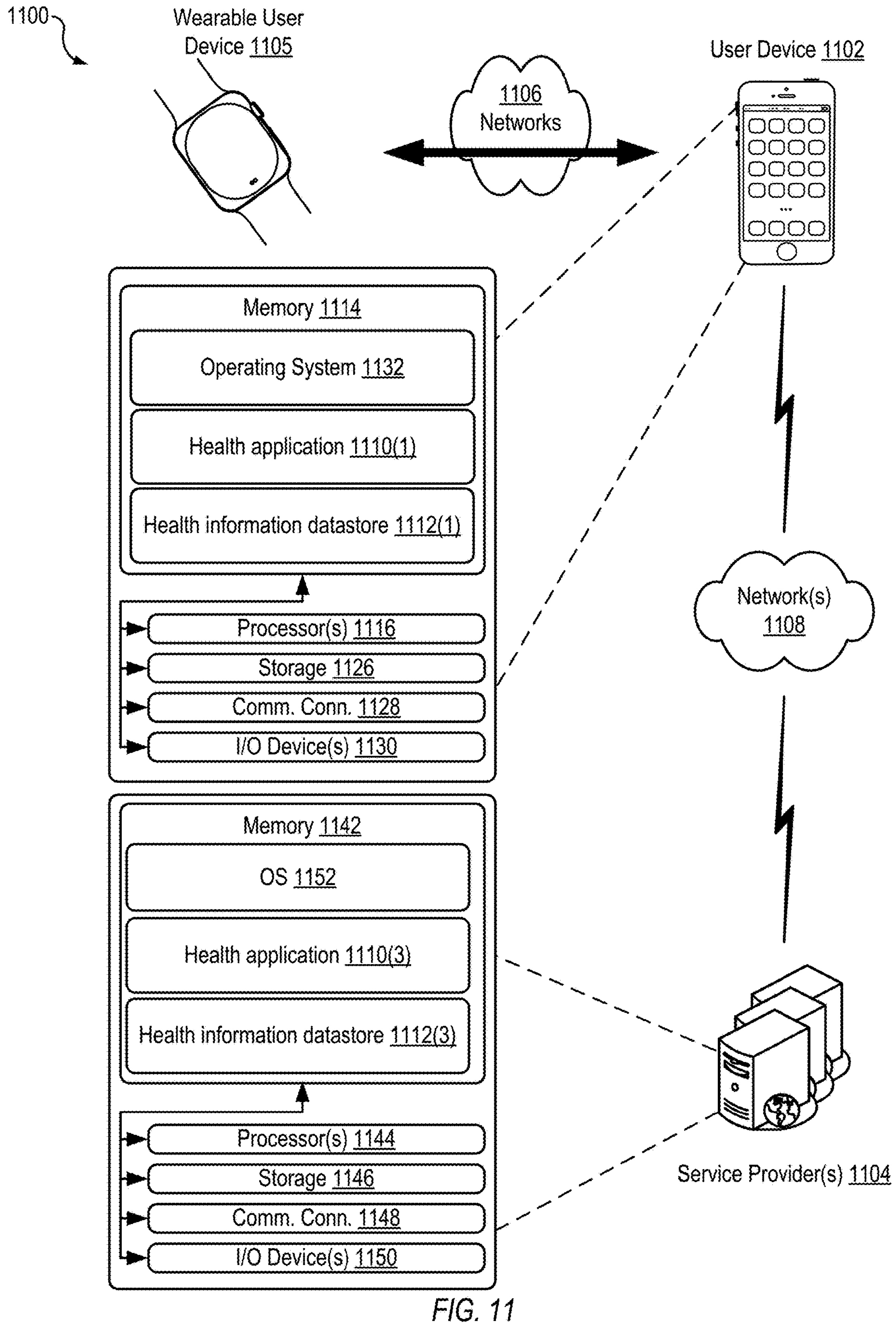
FIG. 11 illustrates an example architecture or environment configured to implement techniques relating to conducting sharing of health data updates among user devices and identifying changes in health data, according to at least one example.

FIG. 11 illustrates an example architecture or environment 1100 configured to implement techniques relating to conducting sharing of health data updates among user devices, according to at least one example. In some examples, the example architecture 1100 may further be configured to enable a user device 1102 (e.g., the user device 102, 104, 106), the service provider computers 1104 (e.g., the service provider 130), and a wearable electronic device 1105 (e.g., an example accessory device) to share information. In some examples, the devices may be connected via one or more networks 1108 and/or 1106 (e.g., via Bluetooth, WiFi, the Internet, or the like). In the architecture 1100, one or more users may utilize the user device 1102 to manage, control, or otherwise utilize the wearable electronic device 1105, via the one or more networks 1106. Additionally, in some examples, the wearable electronic device 1105, the service provider computers 1104, and the user device 1102 may be configured or otherwise built as a single device. For example, the wearable electronic device 1105 and/or the user device 1102 may be configured to implement the examples described herein as a single computing unit, exercising the examples described above and below without the need for the other devices described.

In some examples, the networks 1106, 1108 may include any one or a combination of many different types of networks, such as cable networks, the Internet, wireless networks, cellular networks, satellite networks, other private and/or public networks, or any combination thereof. While the illustrated example represents the user device 1102 accessing the service provider computers 1104 via the networks 1108, the described techniques may equally apply in instances where the user device 1102 interacts with the service provider computers 1104 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the user device 1102 may be configured to collect and/or manage user activity data potentially received from the wearable electronic device 1105. In some examples, the wearable electronic device 1105 may be configured to provide health, fitness, activity, and/or medical data of the user to a third- or first-party application (e.g., the service provider computer 1104). In turn, this data may be used by the user device 1102 to identify trends and/or for sharing. The user device 1102 may be any type of computing device such as, but not limited to, a mobile phone, a smartphone, a personal digital assistant (PDA), a laptop computer, a desktop computer, a thin-client device, a tablet computer, a wearable device, or the like. In some examples, the user device 1102 may be in communication with the service provider computers 1104 and/or the wearable electronic device 1105 via the networks 1108, 1106, or via other network connections.

In one illustrative configuration, the user device 1102 may include at least one memory 1114 and one or more processing units (or processor(s)) 1116. The processor(s) 1116 may be implemented as appropriate in hardware, computer-executable instructions, firmware, or combinations thereof. Computer-executable instruction or firmware implementations of the processor(s) 1116 may include computer-executable or machine-executable instructions written in any suitable programming language to perform the various functions described. The user device 1102 may also include geo-location devices (e.g., a global positioning system (GPS) device or the like) for providing and/or recording geographic location information associated with the user device 1102. In some examples, the wearable user device 1105 may also include geo-location devices for providing and/or recording geographic location information associated with wearable user device 1105.

The memory 1114 may store program instructions that are loadable and executable on the processor(s) 1116, as well as data generated during the execution of these programs. Depending on the configuration and type of the user device 1102, the memory 1114 may be volatile (such as random access memory (RAM)) and/or non-volatile (such as read-only memory (ROM), flash memory, etc.). The user device 1102 may also include additional removable storage and/or non-removable storage 1126 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1114 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1114 and the additional storage 1126, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1114 and the additional storage 1126 are both examples of non-transitory computer storage media. Additional types of computer storage media that may be present in the user devices 102, 104, 106 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1102. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 1102 may also contain communications connection(s) 1128 that allow the user device 1102 to communicate with a data store, another computing device or server, user terminals, and/or other devices via the networks 1108, 1106. The user device 1102 may also include I/O device(s) 1130, such as a keyboard, a mouse, a pen, a voice input device, a touch input device, a display, an operating system 1132 and/or one or more application programs or services for implementing the features disclosed herein including a health application 1110(1) and a health information datastore 1112(1). In some examples, the health application 1110(1) may be configured to implement the features described herein. As described in detail with reference to later figures, the wearable user device 1105 may include a memory that includes a similar health application 1110(2), which may be accessible by one or more processors of the wearable user device 1105. The service provider computer 1104 may also include a memory 1142 that includes a health application 1110(3). In some examples, the health information datastore 1112(1) may be configured to store health information and/or samples as described herein. As described in detail with reference to later figures, the wearable user device 1105 may include a memory that includes a similar health information datastore 1112(2), which may be accessible by one or more processors of the wearable user device 1105. The service provider computer 1104 may also include a memory 1142 that includes health information datastore 1112(3). In this manner, the techniques described herein may be implemented by any one, or a combination of more than one, of the computing devices (e.g., the wearable user device 1105, the user device 1102, or the service provider computer 1104).

The service provider computers 1104 may also be any type of computing device such as, but not limited to, a mobile phone, a smartphone, a PDA, a laptop computer, a desktop computer, a thin-client device, a tablet computer, a wearable device, a server computer, a virtual machine instance, etc. In some examples, the service provider computers 1104 may be in communication with the user device 1102 and/or the wearable user device 1105 via the networks 1108, 1106, or via other network connections.

In one illustrative configuration, the service provider computers 1104 may include at least one memory 1142 and one or more processing units (or processor(s)) 1144. The processor(s) 1144 may be implemented as appropriate in hardware, computer-executable instructions, firmware, or combinations thereof. Computer-executable instruction or firmware implementations of the processor(s) 1144 may include computer-executable or machine-executable instructions written in any suitable programming language to perform the various functions described.

The memory 1142 may store program instructions that are loadable and executable on the processor(s) 1144, as well as data generated during the execution of these programs. Depending on the configuration and type of service provider computer 1104, the memory 1142 may be volatile (such as RAM) and/or non-volatile (such as ROM, flash memory, etc.). The service provider computer 1104 may also include additional removable storage and/or non-removable storage 1146 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1142 may include multiple different types of memory, such as SRAM, DRAM, or ROM. While the volatile memory described herein may be referred to as RAM, any volatile memory that would not maintain data stored therein once unplugged from a host and/or power would be appropriate. The memory 1142 and the additional storage 1146, both removable and non-removable, are both additional examples of non-transitory computer-readable storage media.

The service provider computer 1104 may also contain communications connection(s) 1148 that allow the service provider computer 1104 to communicate with a data store, another computing device or server, user terminals and/or other devices via the networks 1108, 1106. The service provider computer 1104 may also include I/O device(s) 1150, such as a keyboard, a mouse, a pen, a voice input device, a touch input device, a display, speakers, a printer, etc.

Turning to the contents of the memory 1142 in more detail, the memory 1142 may include an operating system 1152 and/or one or more application programs or services for implementing the features disclosed herein including the health application 1110(3).

Examples described herein may take the form of, be incorporated in, or operate with a suitable wearable electronic device, for example wearable user device 1105 of FIG. 11. One example of such a device may be worn on a user's wrist and secured thereto by a band. The wearable user device 1105 may have a variety of functions including, but not limited to: keeping time; monitoring a user's physiological signals and providing health-related information based at least in part on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gathering data from one or more sensors that may be used to initiate, control, or modify operations of the device; determining a location of a touch on a surface of the device and/or an amount of force exerted on the device, and using either or both as input; accepting voice input to control one or more functions; accepting tactile input to control one or more functions; and so on.

Alternative examples of suitable electronic devices include a phone; a tablet computing device; a portable media player; and so on. Still other suitable electronic devices may include laptop/notebook computers, personal digital assistants, touch screens, input-sensitive pads or surfaces, and so on.

In some examples the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some examples, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such examples the band may include electrical interconnections that permit the two devices to transmit signals to one another and thereby interact with one another.

In many examples, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some examples.

The device may also include one or more touch sensors to determine a location of a touch on the cover glass. A touch sensor may be incorporated into or on the display stack in order to determine a location of a touch. The touch sensor may be self-capacitive in certain examples, mutual-capacitive in others, or a combination thereof.

Similarly, the device may include a force sensor to determine an amount of force applied to the cover glass. The force sensor may be a capacitive sensor in some examples and a strain sensor in other examples. In either example, the force sensor is generally transparent and made from transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one example the force sensor may take the form of a gasket extending beneath the periphery of the display. The gasket may be segmented or unitary, depending on the example.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative examples the haptic actuator may be rotary or any other type). A speaker may provide auditory components of an alert and the aforementioned display may provide visual alert components. In some examples a dedicated light, display, or other visual output component may be used as part of an alert.

The auditory, haptic, and/or visual components of the alert may be synchronized to provide an overall experience to a user. One or more components may be delayed relative to other components to create a desired synchronization among them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output, but at a weak or even subliminal level, thereby priming the wearer to receive the auditory output.

Figure 12:
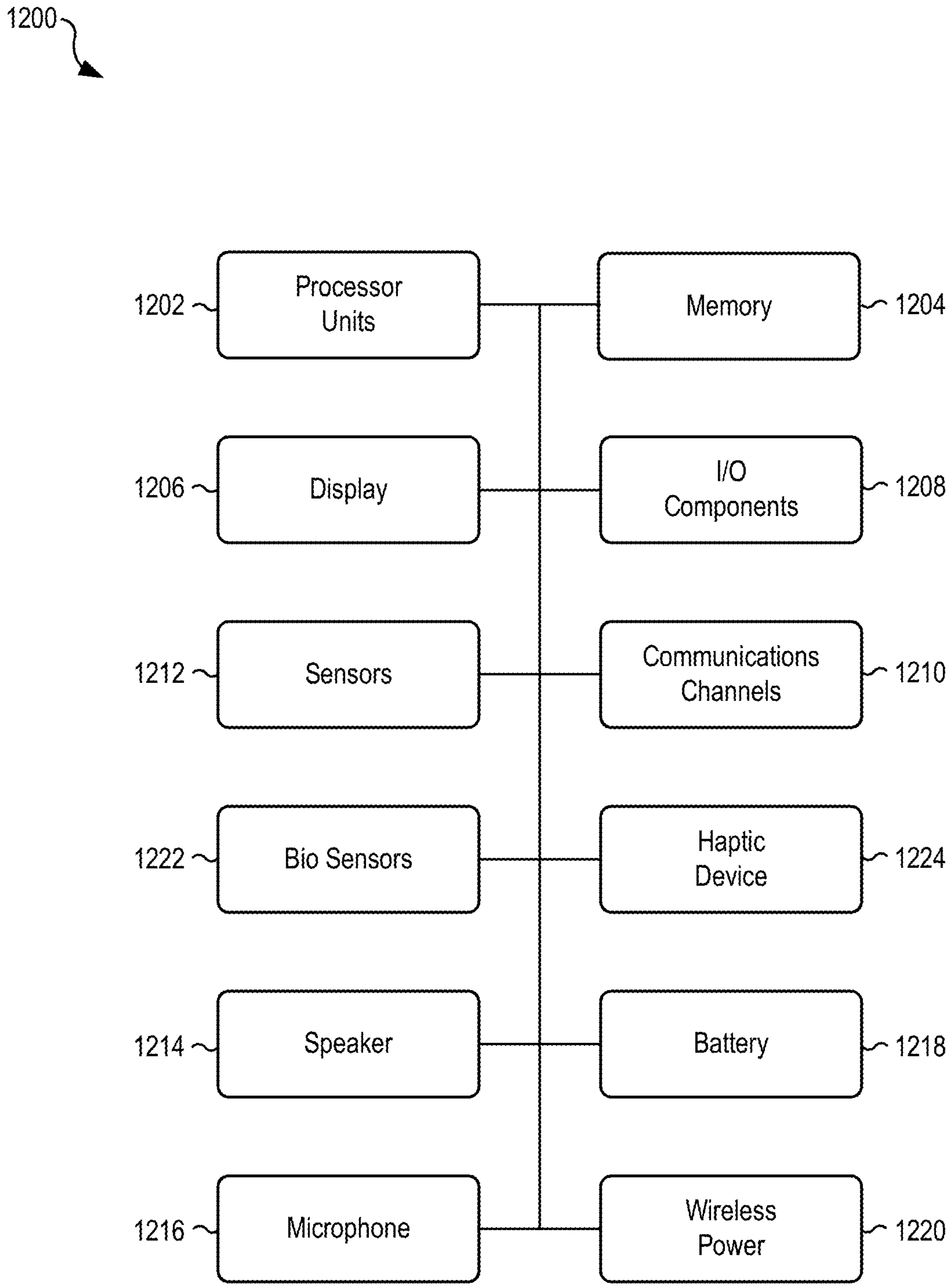
FIG. 12 illustrates a simplified block diagram including components of an example electronic device for implementing techniques relating to conducting sharing of health data updates among user devices and identifying changes in health data, according to at least one example.

FIG. 12 depicts an example schematic diagram of an electronic device 1200. The electronic device 1200 is an example of the wearable user device 1105 and/or the user device 1102 (and other user devices described herein). As shown in FIG. 12, the device 1200 includes one or more processing units 1202 that are configured to access a memory 1204 having instructions stored thereon.

Memories 1204, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1204 is an example of non-transitory computer storage media. Additional types of computer storage media that may be present in the user devices 102, 104, 106, 1102, 1105 may include, but are not limited to, phase-change RAM (PRAM), SRAM, DRAM, RAM, ROM, EEPROM, flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1200. Combinations of any of the above should also be included within the scope of non-transitory computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The instructions or computer programs may be configured to perform one or more of the operations or functions described with respect to the device 1200 (e.g., the health application 1110(2)). For example, the instructions may be configured to control or coordinate the operation of the various components of the device. Such components include, but are not limited to, display 1206, one or more input/output components 1208, one or more communication channels 1210, one or more sensors 1212, a speaker 1214, microphone 1216, a battery 1218, wireless power 1220, bio sensors 1222, and/or one or more haptic feedback devices 1224. In some examples the speaker and microphone may be combined into a single unit and/or may share a common port through a housing of the device.

The processing units 1202 of FIG. 12 may be implemented as any electronic device capable of processing, receiving, or transmitting data or instructions. For example, the processing units 1202 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

As shown in FIG. 12, the device 1200 may also include one or more acoustic elements, including a speaker 1214 and/or a microphone 1216. The speaker 1214 may include drive electronics or circuitry and may be configured to produce an audible sound or acoustic signal in response to a command or input. Similarly, the microphone 1216 may also include drive electronics or circuitry and is configured to receive an audible sound or acoustic signal in response to a command or input. The speaker 1214 and the microphone 1216 may be acoustically coupled to a port or opening in the case that allows acoustic energy to pass, but may prevent the ingress of liquid and other debris.

Illustrative methods and systems for managing user device connections are described above. Some or all of these systems and methods may, but need not, be implemented at least partially by architectures such as those shown at least in FIGS. 1-12. While many of the examples are described above with reference to personal, activity, and/or health-related information, it should be understood that any type of user information or non-user information (e.g., data of any type) may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

In the following, further examples are described to facilitate the understanding of the present disclosure.

Example 1. In this example, there is provided a method, comprising:

receiving, by a second device, a hold instruction from a first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

holding, by the second device, the second notification;

receiving, by the second device, the first health information; and rescheduling, by the second device, the second notification to be displayed at a third time based at least in part on the first health information.

Example 2. The method of any of the subsequent or preceding claims, wherein holding the second notification comprises preventing the second notification from being displayed on the second device until the second device receives and processes the first health information.

Example 3. The method of any of the subsequent or preceding claims, wherein holding the second notification comprises dismissing the second notification from being displayed on the second device until the second device receives and processes the first health information.

Example 4. The method of any of the subsequent or preceding claims, wherein the second notification was previously scheduled to be displayed at a fourth time, wherein the fourth time and the third time are not a same time.

Example 5. The method of any of the subsequent or preceding claims, wherein the second device receives the first health information from a service provider, wherein the first device is configured to transmit the first health information to the service provider, wherein the method further comprises:

transmitting, by the second device, a request for the first health information to the service provider.

Example 6. The method of any of the subsequent or preceding claims, further comprising, prior to receiving the first health information, unlocking the second device from a closed access state.

Example 7. The method of any of the subsequent or preceding claims, wherein the hold instruction includes an expiration date, wherein the method further comprises:

determining, by the second device, that the expiration date of the hold instruction has not elapsed.

Example 8. The method of any of the subsequent or preceding claims, wherein the hold instruction includes one or more criterion, wherein the method further comprises:

determining, by the second device, that the one or more criteria have been met.

Example 9. In this example, there is provided a second device, comprising:

a memory configured to store computer-executable instructions; and one or more processors in communication with the memory and configured to access the memory and execute the computer-executable instructions to:

receive a hold instruction from a first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

hold the second notification;

receive the first health information; and reschedule the second notification to be displayed at a third time based at least in part on the first health information.

Example 10. The second device of any of the subsequent or preceding claims, wherein holding the second notification comprises preventing the second notification from being displayed on the second device until the second device receives and processes the first health information.

Example 11. The second device of any of the subsequent or preceding claims, wherein holding the second notification comprises dismissing the second notification from being displayed on the second device until the second device receives and processes the first health information.

Example 12. The second device of any of the subsequent or preceding claims, wherein the second notification was previously scheduled to be displayed at a fourth time, wherein the fourth time and the third time are not a same time.

Example 13. The second device of any of the subsequent or preceding claims, wherein the second device receives the first health information from a service provider, wherein the first device is configured to transmit the first health information to the service provider, wherein the one or more processors is further configured to access the memory and execute the computer-executable instructions to:

transmit a request for the first health information to the service provider.

Example 14. The second device of any of the subsequent or preceding claims, wherein the one or more processors is further configured to access the memory and execute the computer-executable instructions to:

prior to receiving the first health information, unlocking the second device from a closed access state.

Example 15. In this example, there is provided one or more non-transitory computer-readable media comprising computer-executable instructions that, when executed by one or more processors of a first device, cause the one or more processors to perform operations comprising:

receiving, by the second device, a hold instruction from a first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

holding, by the second device, the second notification;

receiving, by the second device, the first health information; and rescheduling, by the second device, the second notification to be displayed at a third time based at least in part on the first health information.

Example 16. The one or more non-transitory computer-readable media of any of the subsequent or preceding claims, wherein holding the second notification comprises preventing the second notification from being displayed on the second device until the second device receives and processes the first health information.

Example 17. The one or more non-transitory computer-readable media of any of the subsequent or preceding claims, wherein holding the second notification comprises dismissing the second notification from being displayed on the second device until the second device receives and processes the first health information.

Example 18. The one or more non-transitory computer-readable media of any of the subsequent or preceding claims, wherein the second notification was previously scheduled to be displayed at a fourth time, wherein the fourth time and the third time are not the same.

Example 19. The one or more non-transitory computer-readable media of any of the subsequent or preceding claims, wherein the second device receives the first health information from a service provider, wherein the first device is configured to transmit the first health information to the service provider, wherein the operations further comprise:

transmitting, by the second device, a request for the first health information to the service provider.

Example 20. The one or more non-transitory computer-readable media of any of the subsequent or preceding claims, wherein the operations further comprise, prior to receiving the first health information, unlocking the second device from a closed access state.

Example 21. In this example is provided a method comprising:

receiving, by a first device, first health information;

rescheduling, by the first device, a first notification on the first device to be displayed at a first time based at least in part on the first health information, wherein the first notification was scheduled to be displayed at a second time; and transmitting, by the first device, a hold instruction to a second device, wherein the hold instruction instructs the second device to hold a second notification until the second device receives the first health information, wherein the second notification corresponds to the first notification.

Example 22. The method of any of the subsequent or preceding claims, wherein the second device is configured to hold the second notification by preventing the second notification from being displayed on the second device until the second device receives and processes the first health information.

Example 23. The method of any of the subsequent or preceding claims, wherein the second device is configured to hold the second notification by dismissing the second notification from being displayed on the second device until the second device receives and processes the first health information.

Example 24. The method of any of the subsequent or preceding claims, further comprising transmitting, by the first device, the first health information to a service provider, wherein the service provider is configured to transmit the first health information to the second device.

Example 25. The method of any of the subsequent or preceding claims, wherein the second device is configured to be unlocked from a closed access state and, after being unlocked from the closed access state, transmit a request for the first health information to the service provider.

Example 26. The method of any of the subsequent or preceding claims, wherein the hold instruction includes an expiration date, wherein the second device is configured to ignore the hold instruction if the expiration date has elapsed.

Example 27. The method of any of the subsequent or preceding claims, wherein the hold instruction includes one or more criterion, wherein the second device is configured to ignore the hold instruction if the one or more criteria are not met.

Example 28. A first device, comprising:

a memory configured to store computer-executable instructions; and one or more processors in communication with the memory and configured to access the memory and execute the computer-executable instructions to:

receive first health information;

reschedule a first notification on the first device to be displayed at a first time based at least in part on the first health information, wherein the first notification was scheduled to be displayed at a second time; and transmit a hold instruction to a second device, wherein the hold instruction instructs the second device to hold a second notification until the second device receives the first health information, wherein the second notification corresponds to the first notification.

Example 29. The first device of any of the subsequent or preceding claims, wherein the second device is configured to hold the second notification by preventing the second notification from being displayed on the second device until the second device receives and processes the first health information.

Example 30. The first device of any of the subsequent or preceding claims, wherein the second device is configured to hold the second notification by dismissing the second notification from being displayed on the second device until the second device receives and processes the first health information.

Example 31. The first device of any of the subsequent or preceding claims, wherein the one or more processors is further configured to access the memory and execute the computer-executable instructions to:

transmitting, by the first device, the first health information to a service provider, wherein the service provider is configured to transmit the first health information to the second device.

Example 32. The first device of any of the subsequent or preceding claims, wherein the second device is configured to be unlocked from a closed access state and, after being unlocked from the closed access state, transmit a request for the first health information to the service provider.

Example 33. The first device of any of the subsequent or preceding claims, wherein the hold instruction includes an expiration date, wherein the second device is configured to ignore the hold instruction if the expiration date has elapsed.

Example 34. In this example is provided one or more non-transitory computer-readable media comprising computer-executable instructions that, when executed by one or more processors on a first device, cause the one or more processors to perform operations comprising:

receiving, by the first device, first health information;

rescheduling, by the first device, a first notification on the first device to be displayed at a first time based at least in part on the first health information, wherein the first notification was scheduled to be displayed at a second time; and transmitting, by the first device, a hold instruction to a second device, wherein the hold instruction instructs the second device to hold a second notification until the second device receives the first health information, wherein the second notification corresponds to the first notification.

Example 35. The one or more non-transitory computer-readable media of any of the subsequent or preceding claims, wherein the second device is configured to hold the second notification by preventing the second notification from being displayed on the second device until the second device receives and processes the first health information.

Example 36. The one or more non-transitory computer-readable media of any of the subsequent or preceding claims, wherein the second device is configured to hold the second notification by dismissing the second notification from being displayed on the second device until the second device receives and processes the first health information.

Example 37. The one or more non-transitory computer-readable media of any of the subsequent or preceding claims, wherein the operations further comprise transmitting, by the first device, the first health information to a service provider, wherein the service provider is configured to transmit the first health information to the second device.

Example 38. The one or more non-transitory computer-readable media of any of the subsequent or preceding claims, wherein the second device is configured to be unlocked from a closed access state and, after being unlocked from the closed access state, transmit a request for the first health information to the service provider.

Example 39. The one or more non-transitory computer-readable media of any of the subsequent or preceding claims, wherein the hold instruction includes an expiration date, wherein the second device is configured to ignore the hold instruction if the expiration date has elapsed.

Example 40. The one or more non-transitory computer-readable media of any of the subsequent or preceding claims, wherein the hold instruction includes one or more criterion, wherein the second device is configured to ignore the hold instruction if the one or more criteria are not met.

Example 41. In this example is provided a method comprising:

- receiving, by a service provider, first health information from a first device, wherein the first device is configured to reschedule a first notification on the first device to be displayed at a first time based at least in part on the first health information, wherein the first notification was scheduled to be displayed at a second time;
- receiving, by the service provider, a request for the first health information from a second device, wherein the second device is configured to receive a hold instruction from the first device, wherein the hold instruction instructs the second device to hold a second notification until the second device receives the first health information, wherein the second notification corresponds to the first notification; and
- transmitting, by the service provider, the first health information to the second device, wherein the second device is configured to reschedule the second notification to be displayed at a third time based at least in part on the first health information.

Example 42. The method of any of the subsequent or preceding claims, wherein holding the second notification comprises preventing the second notification from being displayed on the second device until the second device receives and processes the first health information.

Example 43. The method of any of the subsequent or preceding claims, wherein holding the second notification comprises dismissing the second notification from being displayed on the second device until the second device receives and processes the first health information.

Example 44. The method of any of the subsequent or preceding claims, wherein the second notification was previously scheduled to be displayed at a fourth time, wherein the fourth time and the third time are not the same.

Example 45. The method of any of the subsequent or preceding claims, wherein the second device is configured to transmit the request for the first health information after the second device is unlocked from a closed access state.

Example 46. The method of any of the subsequent or preceding claims, wherein the hold instruction includes an expiration date, wherein the second device is configured to ignore the hold instruction if the expiration date has elapsed.

Example 47. The method of any of the subsequent or preceding claims, wherein the hold instruction includes one or more criterion, wherein the second device is configured to ignore the hold instruction if the one or more criteria are not met.

Example 48. In this example is provided a computing system, comprising:

- a memory configured to store computer-executable instructions; and
- one or more processors in communication with the memory and configured to access the memory and execute the computer-executable instructions to:
- receive first health information from a first device, wherein the first device is configured to reschedule a first notification on the first device to be displayed at a first time based at least in part on the first health information, wherein the first notification was scheduled to be displayed at a second time;
- receive a request for the first health information from a second device, wherein the second device is configured to receive a hold instruction from the first device, wherein the hold instruction instructs the second device to hold a second notification until the second device receives the first health information, wherein the second notification corresponds to the first notification; and
- transmit the first health information to the second device, wherein the second device is configured to reschedule the second notification to be displayed at a third time based at least in part on the first health information.

Example 49. The computing system of any of the subsequent or preceding claims, wherein holding the second notification comprises preventing the second notification from being displayed on the second device until the second device receives and processes the first health information.

Example 50. The computing system of any of the subsequent or preceding claims, wherein holding the second notification comprises dismissing the second notification from being displayed on the second device until the second device receives and processes the first health information.

Example 51. The computing system of any of the subsequent or preceding claims, wherein the second notification was previously scheduled to be displayed at a fourth time, wherein the fourth time and the third time are not the same.

Example 52. The computing system of any of the subsequent or preceding claims, wherein the second device is configured to transmit the request for the first health information after the second device is unlocked from a closed access state.

Example 53. The computing system of any of the subsequent or preceding claims, wherein the hold instruction includes an expiration date, wherein the second device is configured to ignore the hold instruction if the expiration date has elapsed.

Example 54. In this example is provided one or more non-transitory computer-readable media comprising computer-executable instructions that, when executed by one or more processors of a computing system, cause the one or more processors to perform operations comprising:

- receiving, by the computing system, first health information from a first device, wherein the first device is configured to reschedule a first notification on the first device to be displayed at a first time based at least in part on the first health information, wherein the first notification was scheduled to be displayed at a second time;

receiving, by the computing system, a request for the first health information from a second device, wherein the second device is configured to receive a hold instruction from the first device, wherein the hold instruction instructs the second device to hold a second notification until the second device receives the first health information, wherein the second notification corresponds to the first notification; and transmitting, by the computing system, the first health information to the second device, wherein the second device is configured to reschedule the second notification to be displayed at a third time based at least in part on the first health information.

Example 55. The one or more non-transitory computer-readable media of any of the subsequent or preceding claims, wherein holding the second notification comprises preventing the second notification from being displayed on the second device until the second device receives and processes the first health information.

Example 56. The one or more non-transitory computer-readable media of any of the subsequent or preceding claims, wherein holding the second notification comprises dismissing the second notification from being displayed on the second device until the second device receives and processes the first health information.

Example 57. The one or more non-transitory computer-readable media of any of the subsequent or preceding claims, wherein the second notification was previously scheduled to be displayed at a fourth time, wherein the fourth time and the third time are not the same.

Example 58. The one or more non-transitory computer-readable media of any of the subsequent or preceding claims, wherein the second device is configured to transmit the request for the first health information after the second device is unlocked from a closed access state.

Example 59. The one or more non-transitory computer-readable media of any of the subsequent or preceding claims, wherein the hold instruction includes an expiration date, wherein the second device is configured to ignore the hold instruction if the expiration date has elapsed.

Example 60. The one or more non-transitory computer-readable media of any of the subsequent or preceding claims, wherein the hold instruction includes one or more criterion, wherein the second device is configured to ignore the hold instruction if the one or more criteria are not met.

The various examples further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®. and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is sharing health data updates between user devices, which may include storing some aspect of the data on a server. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide a family member or friend a view of health data updates. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method comprising:

receiving, by a second device, a hold instruction from a first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

holding, by the second device, the second notification;

receiving, by the second device, the first health information; and rescheduling, by the second device, the second notification to be displayed at a third time based at least in part on the first health information.

2. The method of claim 1, wherein holding the second notification comprises preventing the second notification from being displayed on the second device until the second device receives and processes the first health information.

3. The method of claim 1, wherein holding the second notification comprises dismissing the second notification from being displayed on the second device until the second device receives and processes the first health information.

4. The method of claim 1, wherein the second notification was previously scheduled to be displayed at a fourth time, wherein the fourth time and the third time are not a same time.

5. The method of claim 1, wherein the second device receives the first health information from a service provider, wherein the first device is configured to transmit the first health information to the service provider, wherein the method further comprises:

transmitting, by the second device, a request for the first health information to the service provider.

6. The method of claim 1, further comprising, prior to receiving the first health information, unlocking the second device from a closed access state.

7. The method of claim 1, wherein the hold instruction includes an expiration date, wherein the method further comprises:

determining, by the second device, that the expiration date of the hold instruction has not elapsed.

8. The method of claim 1, wherein the hold instruction includes one or more criteria, wherein the method further comprises:

determining, by the second device, that the one or more criteria have been met.

9. A second device, comprising:

a memory configured to store computer-executable instructions; and one or more processors in communication with the memory and configured to access the memory and execute the computer-executable instructions to:

receive a hold instruction from a first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

hold the second notification;

receive the first health information; and reschedule the second notification to be displayed at a third time based at least in part on the first health information.

10. The second device of claim 9, wherein holding the second notification comprises preventing the second notification from being displayed on the second device until the second device receives and processes the first health information.

11. The second device of claim 9, wherein holding the second notification comprises dismissing the second notification from being displayed on the second device until the second device receives and processes the first health information.

12. The second device of claim 9, wherein the second notification was previously scheduled to be displayed at a fourth time, wherein the fourth time and the third time are not a same time.

13. The second device of claim 9, wherein the second device receives the first health information from a service provider, wherein the first device is configured to transmit the first health information to the service provider, wherein the one or more processors is further configured to access the memory and execute the computer-executable instructions to:

transmit a request for the first health information to the service provider.

14. The second device of claim 9, wherein the one or more processors is further configured to access the memory and execute the computer-executable instructions to:

prior to receiving the first health information, unlocking the second device from a closed access state.

15. One or more non-transitory computer-readable media comprising computer-executable instructions that, when executed by one or more processors of a first device, cause the one or more processors to perform operations comprising:

receiving, by a second device, a hold instruction from the first device, wherein the hold instruction instructs the second device to hold a second notification until the second device receives first health information, wherein the first device is configured to transmit the hold instruction based on rescheduling a first notification on the first device to be displayed at a first time based at least in part on the first health information, wherein the first notification was previously scheduled to be displayed at a second time, wherein the second notification corresponds to the first notification;

holding, by the second device, the second notification;

receiving, by the second device, the first health information; and rescheduling, by the second device, the second notification to be displayed at a third time based at least in part on the first health information.

16. The one or more non-transitory computer-readable media of claim 15, wherein holding the second notification comprises preventing the second notification from being displayed on the second device until the second device receives and processes the first health information.

17. The one or more non-transitory computer-readable media of claim 15, wherein holding the second notification comprises dismissing the second notification from being displayed on the second device until the second device receives and processes the first health information.

18. The one or more non-transitory computer-readable media of claim 15, wherein the second notification was previously scheduled to be displayed at a fourth time, wherein the fourth time and the third time are not the same.

19. The one or more non-transitory computer-readable media of claim 15, wherein the second device receives the first health information from a service provider, wherein the first device is configured to transmit the first health information to the service provider, wherein the operations further comprise:

transmitting, by the second device, a request for the first health information to the service provider.

20. The one or more non-transitory computer-readable media of claim 15, wherein the operations further comprise, prior to receiving the first health information, unlocking the second device from a closed access state.

* * * * *